United States Patent
Martelli et al.

(10) Patent No.: US 9,571,196 B2
(45) Date of Patent: Feb. 14, 2017

(54) MODE MULTIPLEXING OPTICAL COMMUNICATION SYSTEM

(75) Inventors: Paolo Martelli, Milan (IT); Alberto Gatto, Milan (IT); Mario Martinelli, San Donato Milanese (IT)

(73) Assignee: Politecnico do Milano, Milan (IT)

( * ) Notice: Subject to any disclaimer, the term of this patent is extended or adjusted under 35 U.S.C. 154(b) by 504 days.

(21) Appl. No.: 14/129,903

(22) PCT Filed: Jun. 15, 2012

(86) PCT No.: PCT/IB2012/053018
§ 371 (c)(1),
(2), (4) Date: Mar. 26, 2014

(87) PCT Pub. No.: WO2013/001397
PCT Pub. Date: Jan. 3, 2013

(65) Prior Publication Data
US 2014/0199066 A1    Jul. 17, 2014

(30) Foreign Application Priority Data
Jun. 29, 2011 (IT) ............... MI2011A1188

(51) Int. Cl.
*H04J 14/04* (2006.01)
*H04B 10/2581* (2013.01)
*G02B 6/42* (2006.01)

(52) U.S. Cl.
CPC ......... *H04B 10/2581* (2013.01); *G02B 6/4206* (2013.01); *H04J 14/04* (2013.01)

(58) Field of Classification Search
CPC ........ H04J 14/04; H04J 14/06; H04J 14/0278; H04B 10/25; H04B 10/2581; H04B 10/532; H04B 10/60; H04B 10/614
USPC .............. 398/44, 43, 79, 65, 152, 183, 184, 200,398/201, 158, 159, 141, 202, 208, 205, 81; 385/24, 28, 27, 31, 39, 123, 124, 126, 127
See application file for complete search history.

(56) References Cited

U.S. PATENT DOCUMENTS

| | | | |
|---|---|---|---|
| 8,977,121 B2* | 3/2015 | Djordjevic | H04B 10/25 398/43 |
| 9,008,507 B2* | 4/2015 | Winzer | H04B 10/2581 398/26 |
| 2011/0150464 A1 | 6/2011 | Murshid et al. | |

OTHER PUBLICATIONS

Awaji et al., "Demonstration of Spatial Mode Division Multiplexing using Laguerre-Gaussian Mode Beam in telecom-wavelength," IEEE Photonics Society 23$^{rd}$ Annual Meeting, Piscataway NJ, Nov. 7, 2010, pp. 551-552.

(Continued)

*Primary Examiner* — Hanh Phan
(74) *Attorney, Agent, or Firm* — Seed IP Law Group LLP

(57) ABSTRACT

An optical communication system is disclosed. The optical communication system comprises an optical transmitter and a substantially circular multi-mode optical fiber. The optical transmitter comprises a generator of at least two free space circular vortices and comprises an optical element configured to receive the at least two free space circular vortices and to couple them to an input facet of the optical fiber. The optical fiber is configured to receive at the input facet the at least two free space circular vortices and is configured to generate therefrom at least two corresponding guided circular vortices having respective propagation constants, wherein the values of the propagation constants at a defined frequency are different each other.

18 Claims, 5 Drawing Sheets

(56) References Cited

OTHER PUBLICATIONS

Carpentier et al., "Inversion of a guided optical vortex," *Journal of the European Optical Society-Rapid Publications* 1:06031, Dec. 2006, 5 pages.
Djordjevic, "Heterogeneous Transparent Optical Networking Based on Coded OAM Modulation," *IEEE Photonics Journal* 3(3):531-537, Jun. 2011.
International Search Report and Written Opinion for corresponding International Application No. PCT/IB2012/053018, mailed Oct. 26, 2012, 12 pages.
Murshid et al., "Spatial domain multiplexing: A new dimension in fiber optic multiplexing," *Optics & Laser Technology* 40:1030-1036, 2008.
Snyder et al., "Modes of optical waveguides," *J. Opt. Soc. Am.* 68(3):297-309, Mar. 1978.
Stuart, "Dispersive Multiplexing in Multimode Optical Fiber," *Science* 289:281-283, Jul. 14, 2000.

\* cited by examiner

MODE MULTIPLEXING OPTICAL COMMUNICATION SYSTEM

BACKGROUND

Technical Field

The present invention generally relates to the field of the communication over an optical fiber. More in particular, the present invention concerns a communication system over a multi-mode optical fiber by means of the selection of a suitable sub-set of modes.

Description of the Related Art

An optical fiber is capable to provide a high bandwidth and thus it allows the transmission of digital information at high bit rates.

The wavelength division multiplexing technology (known as WDM) has allowed to increase the transmission capacity over a mono-mode optical fiber, but this could be not enough to satisfy the considerable increase of the required bandwidth.

An optical fiber with circular symmetry is capable of supporting a plurality of propagation modes and thus is referred as multi-mode optical fiber. The propagation modes are obtained by means of the solution of the Maxwell equations in the optical fiber, taking into account the boundary conditions between the core and the cladding of the optical fiber; a single propagation constant $\beta$ is associated to each propagation mode, so that the electro-magnetic field variation along the axis z of the optical fiber is described only by one phase term of the type $\exp(i*\beta*z)$, wherein i is the imaginary unit. The vector modes are commonly indicated by TE (transverse electric), TM (transverse magnetic), EH (hybrid with electric dominance), HE (hybrid with magnetic dominance) and are classified based on two indexes $v \geq 0$, $m \geq 1$ having integer values, wherein index v indicates the angular trend of the electric field and index m indicates the radial trend of the electric field. Moreover, it is known that the trend of the transverse component of the electric (and magnetic) field of HE type (and of EH type) can have an even-type symmetry or an odd-type symmetry (see for example FIG. 2(b) of A. W. Snyder, W. R. Young, *Modes of optical waveguides*, Optical Society of America, 1978).

Techniques for transmitting information over a multi-mode optical fiber are known, such as for example the MIMO technique (Multiple Input Multiple Output): see H. R. Stuart, "Dispersive multiplexing in multimode optical fiber", Science, 289, 281 (2000). This technique has the disadvantage to require at the reception side a complex electronic processing of the digital signal, thus requiring high performance processors, which consume high power values. Moreover, the use of a complex electronic processing has the disadvantage of increasing the latency, which could be unacceptable in some applications, such as for example in metropolitan telecommunications networks.

Therefore it would be a technical benefit to be able to find techniques which allow the management of the different modes as independent communication channels. It would be beneficial to avoid or reduce the mixing of the different modes with each other during the propagation and then be able to more easily discriminate such modes in the reception side, namely to prevent the problem known as "mode coupling".

BRIEF SUMMARY

The present embodiments are directed to an optical communication system set forth in claims 1 and 2 and by its various preferred embodiments described in the dependent claims therefrom.

The Applicant has perceived that a suitable selection of circular vortices and transmitting them over a multi-mode optical fiber can reduce the mode coupling between at least two different modes carried over the multi-mode fiber, with the advantage that it is no more necessary to perform a complex electronic processing of the received digital signal, thus reducing the power consumptions and reducing the latency.

The embodiments also include a method set forth in claim 9 and claims dependent therefrom.

BRIEF DESCRIPTION OF THE DRAWINGS

Further characteristics and advantages of the invention will be better understood by the following description of a preferred embodiment and of variants thereof provided as an illustrative way with reference to the attached drawings.

DETAILED DESCRIPTION

Figure 1:
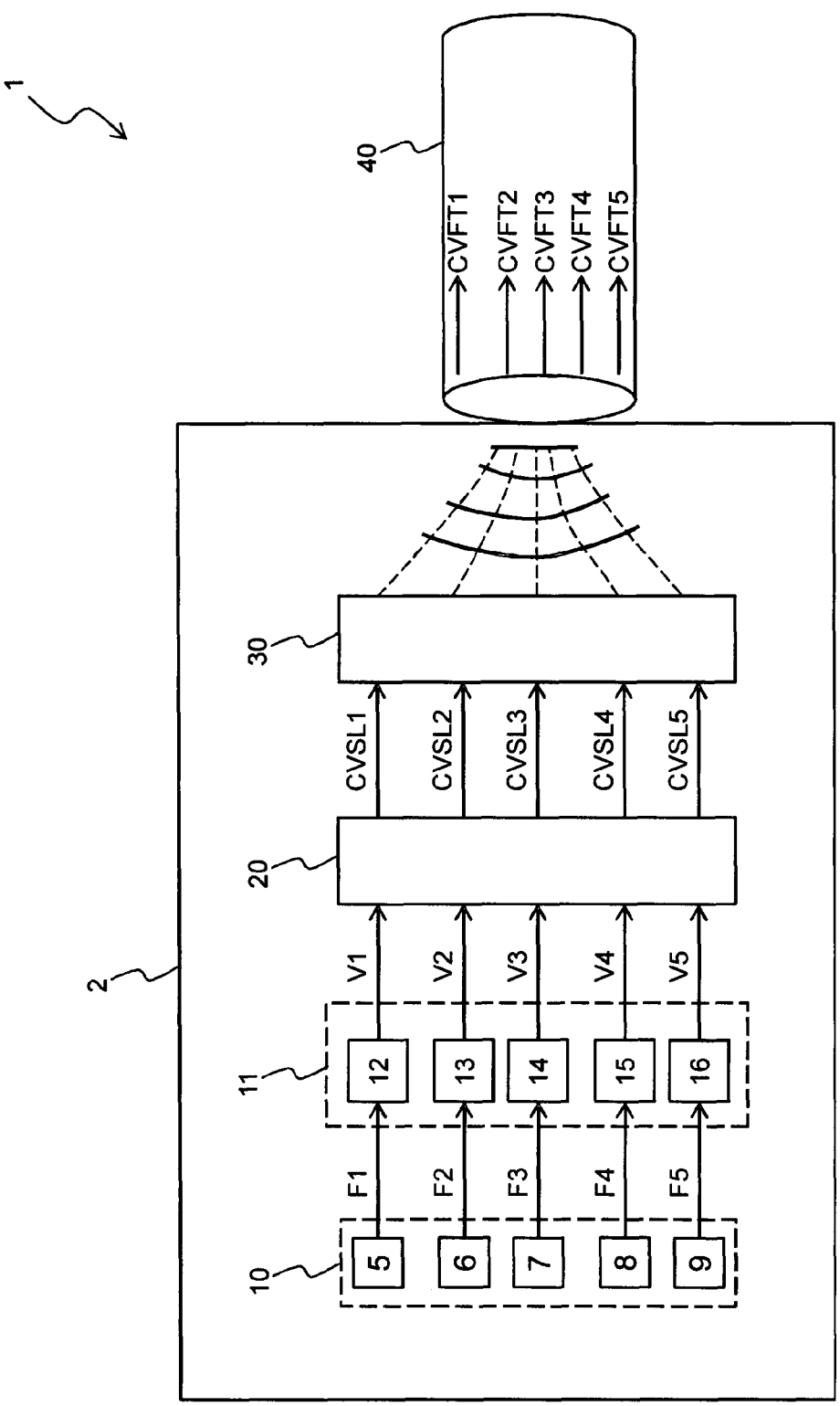
FIG. 1 schematically shows an optical transmitter according to an embodiment of the invention.

It is assumed to use a cylindrical coordinates system ($\rho$, $\theta$, z) coaxial with the optical fiber, wherein z coincides with the optical fiber axis, $\rho$ is the distance of a generic point from axis z of the optical fiber, $\theta$ is the angle formed in the plane (x, y) transverse to axis z.

It is known that an electro-magnetic wave propagating in the fiber can be obtained by a superposition of monochromatic waves.

Therefore it is considered that the electro-magnetic field propagating over the optical fiber is monochromatic, that is the electric field (and the magnetic one) propagating in the optical fiber has a dependence from time t of the sinusoidal type with pulsation $\omega$: according to these assumptions, the components of the electric field (and of the magnetic one) can be represented by a complex number (referred as phasor) containing a spatial term depending on ($\rho$, $\theta$, z) and containing a phase term depending on time t of the type $\exp(-i*\omega*t)$, wherein i is the imaginary unit.

The circular vortices have the following characteristics:

they have a transverse spatial component of the electric field $E_t$ (and magnetic $H_t$) having a uniform polarization state of the circular type, right or left;

the surface of the wavefront of the transverse spatial component of the electric field $E_t$ (and magnetic $H_t$) has a screw trend, clockwise or counter clockwise, that is the spatial distribution in the cylindrical coordinates space ($\rho$, $\theta$, z) of the transverse component $E_t$ of the phasor of the electric field has a trend depending separately on angle $\theta$ according to a phase term of the type $\exp(\pm i*l*\theta)$, wherein l is an integer number (0, 1, 2, . . . ) referred to in the following as angular index and represents the pitch of the screw of the surface of the wavefront (when the value of l increases, the screw pitch decreases), and wherein the sign "+" indicates that the screw direction is clockwise, while the sign "−" indicates that the screw direction is counterclockwise.

Therefore, the distribution in the cylindrical coordinates space (ρ, θ, z) of the transverse component $E_t$ of the phasor of the electric field (and of the magnetic field) of a circular vortex contains the phase term exp(±i*l*θ) which depends on the angular index l, contains an amplitude term $f_m(ρ)$ which depends on the radial index m and contains the phase term exp(−i*l*β*z), wherein β is the propagation constant of the circular vortex assuming specific values as it will described more in detail in the following.

Therefore the distribution in the space of cylindrical coordinates (ρ, θ, z) of the transverse component $E_t$ of the electric field (and magnetic one) of the circular vortices has a dependence of the type $f_m(ρ)$*exp(±i*l*θ)*exp(−i*β*z).

The term $f_m(ρ)$ will be referred in the following as "radial amplitude term" of the circular vortex, while the phase term $f_l(θ)$=exp(±i*l*θ) will be referred in the following as "angular phase term" of the circular vortex.

More in particular, the circular vortices CV propagating over the optical fiber are obtained by combining even and odd types vector modes HE or by linearly combining even and odd types vector modes EH, according to the following formulas:

$CV_{lm}(rt,+)=HE_{l+1,m}(e)+i*HE_{l+1,m}(o)$, wherein l is an integer number greater than or equal to zero (that is l=0,1,2,3, . . . )

$CV_{lm}(lt,+)=EH_{l−1,m}(e)+i*EH_{l−1,m}(o)$, wherein l is an integer number greater than or equal to 2 (that is l=2,3, . . . )

$CV_{lm}(rt,−)=EH_{l−1,m}(e)+i*EH_{l−1,m}(o)$, wherein l is an integer number greater than or equal to 2 (that is l=2,3, . . . )

$CV_{lm}(lt,−)=HE_{l+1,m}(e)+i*HE_{l+1,m}(o)$, wherein l is an integer number greater than or equal to zero (that is l=0,1,2,3, . . . )

wherein:

e indicates the even symmetry (e=even) of the vector mode EH or HE;

o indicates the odd symmetry (o=odd) of the vector mode EH or HE;

rt indicates a right circular polarization state (rt=right) of the circular vortex;

lt indicates a left circular polarization state (lt=left) of the circular vortex;

+ indicates that the direction of the screw of the wavefront of the transverse components of the electric field (and of the magnetic one) is clockwise;

− indicates that the direction of the screw of the wavefront of the transverse components of the electric field (and of the magnetic one) is counterclockwise;

l is the angular index indicating the pitch of the screw of the surface of the wavefront, that is the minimum distance between two different points of the screw having the same coordinates in the plane (x, y);

m≥1 is the radial index indicating the trend of the electric (or magnetic) field as the distance p from the propagation axis z changes.

For more information about the circular vortices, reference is made to the following documents:

A. V. Volyar e T. A. Fadeyeva, "Vortical nature of modes of optical fibers: II Propagation of optical vortices", *Lett. to Journ. Tech. Phys. and Quantum Spectroscopy*, vol. 22, pp. 69-74, 1996;

C. N. Alexeyev et al., "Orbital angular momentum in low-mode optical fibers and its detection", *Proc. SPIE*, vol. 3487, pp. 94-100, 1998;

A. N. Alexeyev, T. A. Fadeyeva, A. V. Volyar, M. S. Soskin, "Optical vortices and the flow of their angular momentum in a multimode fiber", *Semiconductor Physics, Quantum Electronics & Optoelectronics*, 1998, V. 1, N 1, p. 82-89.

The Applicant has noted that each one of the circular vortices is characterized by a single value of the propagation constant β. More in particular:

the circular vortex $CV_{lm}(rt,+)$ is given by the linear combination of only HE modes of even and odd type with the same index v=(l+1) and thus with the same propagation constants $β_1$, therefore also the circular vortex $CV_{lm}(rt,+)$ has propagation constant $β_1$;

the circular vortex $CV_{lm}(lt,+)$ is given by the linear combination of only EH modes of even and odd type with the same index v=(l−1) and thus having the same propagation constants $β_2$, therefore also the circular vortex $CV_{lm}(lt,+)$ has propagation constant $β_2$;

the circular vortex $CV_{lm}(rt,−)$ is given by the linear combination of only EH modes of even and odd type with the same index v=(l−1) and thus having the same propagation constants $β_2$, therefore also the circular vortex $CV_{lm}(rt,−)$ has propagation constant $β_2$, that is equal to the one of the circular vortex $CV_{lm}(lt,+)$;

the circular vortex $CV_{lm}(lt,−)$ is given by the linear combination of only HE mode of even and odd type with the same index v=(l+1) and thus with the same propagation constants $β_1$, therefore also the circular vortex $CV_{lm}(lt,−)$ has propagation constant $β_1$ that is equal to the one of the circular vortex $CV_{lm}(rt,+)$.

It is possible to note that after setting the value of indexes l≥2 and m≥1, there are four circular vortices, wherein two circular vortices ($CV_{lm}(rt,+)$ and $CV_{lm}(lt,−)$) have the same first propagation constant $β_1$ and the other two vortices ($CV_{lm}(lt,+)$ and $CV_{lm}(rt,−)$) have the same second propagation constant $β_2$, wherein the value of the first propagation constant $β_1$ is slightly different from the value of the second propagation constant $β_2$ By setting the value of the indexes l≥2 and m≥1, the circular vortices having the same propagation constant for which one is right polarized and the other is left polarized will be referred in the following as "opposite" circular vortices, thus the circular vortex $CV_{lm}(rt,+)$ is opposite to the circular vortex $CV_{lm}(lt,−)$ (and vice versa) and the circular vortex $CV_{lm}(lt,+)$ is opposite to the circular vortex $CV_{lm}(rt,−)$ (and vice versa). Moreover, it is possible to note that after setting the value of the indexes l=0, 1 and m≥1, there are two circular vortices ($CV_{lm}(rt,+)$ and $CV_{lm}(lt,−)$) which have the same value of the propagation constant β, and thus they are "opposite" each other.

Therefore, a single propagation constant β is associated to each circular vortex and thus each circular vortex is a real mode, that is under ideal conditions (i.e., the optical fiber is perfectly circular and is not affected by external noises) the envelope in the space of the wavefront of the transverse component of the electric (or magnetic) field in the plane (x, y) transverse to the direction of propagation z has a trend which does not change, as the propagation of the circular vortex along the axis z of the optical fiber changes, except for the longitudinal phase term exp(−i*β*z).

Therefore the circular vortices form a set of modes which are orthogonal each other and which keeps the orthogonality in case they propagate over an optical fiber maintaining the circular symmetry and which is not affected by external perturbations: under this assumption the power exchange among different modes carried over the multi-mode optical fiber is substantially zero.

The Applicant has noted that it is possible to reduce the power exchange between at least two different modes carried over the multi-mode optical fiber also in case of perturbations external to the optical fiber which cause a loss of the circular symmetry of the optical fiber, such as for example thermal variations, mechanical perturbations, vibrations, pressures. This is obtained by a suitable selection of the circular vortices which is such to ensure a sufficient distance between them in terms of propagation parameters.

More in particular, the Applicant has determined that it is beneficial to choose (for a determined frequency) at least two substantially different values of the propagation constant $\beta$ associated to at least two circular vortices which are injected into the multi-mode optical fiber for reducing the power exchange between at least two circular vortices carried over the multi-mode optical fiber. Preferably, the difference $\Delta$li between the reciprocal values of the propagation constants $\beta$ of at least two of the circular vortices selected for the propagation over the multi-mode optical fiber is greater than or equal to about $0.5*10^2$ m$^{-1}$, which corresponds to a beat length (defined as the length after which the electric field has again the same transverse trend) greater than about 12 cm, which would correspond to the excitation of a frequency of an acoustic wave resonating at about 0.33 MHz, which is very difficult to excite due to environmental perturbations (typically, at low frequency) which affect the multi-mode optical fiber.

Advantageously, the difference between the reciprocal values of the propagation constants of at least two of the selected circular vortices is greater than or equal to $1.5*10^2$ m$^{-1}$, which corresponds to a beat length greater than or equal to about 4 cm, which would correspond to the excitation of a frequency of an acoustic wave resonating at about 1 MHz, which also in this case is very difficult to excite due to the environmental perturbations which affect the multi-mode optical fiber.

Moreover, the Applicant has observed that the propagation constant $\beta$ of the circular vortices carried over an optical fiber can be considered, to a first approximation, as directly proportional to the parameter (2*m+l+1), wherein m is the radial index and l is the angular index of the circular vortices. Therefore in order to obtain a reduction of the power exchange between at least two circular vortices propagating over a multi-mode optical fiber, it is necessary:
- to select at the transmission side suitable values of the angular index l and of the radial index m so that the values of the parameters (2*m+l+1) of the selected circular vortices are different each other;
- for equal values of the radial index m and of the angular index l, to select at the transmission side only one circular vortex (out of the four possible for l≥2, m≥1 or out of the two possible for l=0, 1, m≥1).

It is noted that, after setting the value of the radial index m and of the angular index l and after selecting at the transmission side one of the circular vortices (selected out of the four possible circular vortices for l≥2 and m≥1, or selected out of the two possible circular vortices for l=0, 1 and defined values of m≥1), during the propagation of the selected circular vortex along the multi-mode optical fiber it is possible which occurs (due to the perturbations external to the multi-mode optical fiber) a power exchange between the circular vortex selected at the transmission side (that is the one injected at the input facet of the multi-mode optical fiber, the term "input facet" refers to the input face or location the signal enters into the fiber optic cable) and its opposite circular vortex, because the opposite circular vortices have the same propagation constant $\beta$. In other words, if it is supposed to inject at the transmission side the circular vortex $CV_{lm}(rt,+)$ in the multi-mode optical fiber, due to said perturbations it is possible that the opposite circular vortex $CV_{lm}(lt,-)$ is also excited in the multi-mode optical fiber and thus it is possible that a portion (for example, 30%) of the optical power injected at the transmission side over the circular vortex $CV_{lm}(rt,+)$ is transferred to the circular vortex $CV_{lm}(lt,-)$. Consequently, at the reception side (that is at the output of the multi-mode optical fiber) it is necessary to take into account this power mixing to be able to recover all the power associated to a determined value of the radial index m and of the angular index l.

It will be described in the following some examples regarding the choice of the values of the radial index m and angular index l which allow a reduction of the power exchange.

Example 1

In this series of examples the value of the radial index m is set and only the value of the angular index l is changed. Moreover, it is selected at the transmission side (that is at the input facet, or face, of the multi-mode optical fiber) only one circular vortex for equal values of the radial index m and of the angular index l.

Example 1.1

Set the value of the radial index to m=1, and then select the values of the angular index to l=0, 1, 2, 3, 4 and thus the circular vortices have a propagation constant $\beta$ which is, to a first approximation, proportional to the value 2*1+l+1=l+3: in this case the circular vortices have different propagation constants $\beta$ because they are, to a first approximation, proportional to the values 3, 4, 5, 6, 7. Moreover, the circular vortices $CV_{l1}(rt,+)$ are chosen (for the same value of l), that is having a right circular polarization and a clockwise screw direction.

Therefore in this example it is possible to inject at the transmission side five modes at the input facet of the multi-mode optical fiber which are the following five circular vortices with a right circular polarization and a clockwise screw direction:

$CV_{01}(rt,+), CV_{11}(rt,+), CV_{21}(rt,+), CV_{31}(rt,+), CV_{41}(rt,+)$

It is observed that during the propagation along the multi-mode optical fiber it is possible to have a power exchange between the circular vortices selected at the transmission side (and injected at the input facet of the multi-mode optical fiber) and the respective opposite circular vortices, that is:
- the circular vortex $CV_{01}(rt,+)$ can exchange power with the circular vortex $CV_{01}(lt,-)$;
- the circular vortex $CV_{11}(rt,+)$ can exchange power with the circular vortex $CV_{11}(lt,-)$;
- the circular vortex $CV_{21}(rt,+)$ can exchange power with the circular vortex $CV_{21}(lt,-)$;
- the circular vortex $CV_{31}(rt,+)$ can exchange power with the circular vortex $CV_{31}(lt,-)$;
- the circular vortex $CV_{41}(rt,+)$ can exchange power with the circular vortex $CV_{41}(lt,-)$.

It is observed that the choice of the minimum value of the radial index m=1 is particularly advantageous because it reduces the possibility of introducing coupling between different circular vortices in the step of coupling the circular vortices (generated in the free space) into the multi-mode optical fiber.

Example 1.2

This example is analogous to example 1.1 (m=1, l=0, 1, 2, 3, 4), with the difference that the circular vortices $CV_{l1}$ (lt,−) are chosen (for a determined value of l), that is with a left circular polarization and a counterclockwise screw direction.

Therefore in this example it is possible to inject at the transmission side five modes at the input facet of the multi-mode optical fiber which are the following five circular vortices:

$CV_{01}(lt,-)$, $CV_{11}(lt,-)$, $CV_{21}(lt,-)$, $CV_{31}(lt,-)$, $CV_{41}(lt,-)$

Analogously to what has been explained in the example 1.1, during the propagation along the multi-mode optical fiber it is possible to have a power exchange between the circular vortices $CV_{01}(lt,-)$, $CV_{11}(lt,-)$, $CV_{21}(lt,-)$, $CV_{31}(lt,-)$, $CV_{41}(lt,-)$, and the respective opposite circular vortices $CV_{01}(rt,+)$, $CV_{11}(rt,+)$, $CV_{21}(rt,+)$, $CV_{31}(rt,+)$, $CV_{41}(rt,+)$.

Example 1.3

This example is analogous to example 1.1 (m=1, l=0, 1, 2, 3, 4), with the difference that the circular vortices $CV_{l1}(rt,+)$ and $CV_{l1}(lt,-)$ are chosen (for a determined value of l) alternatively.

Therefore in this example it is possible to inject at the transmission side five modes at the input facet of the multi-mode optical fiber which are the following five circular vortices:

$CV_{01}(rt,+)$, $CV_{11}(lt,-)$, $CV_{21}(rt,+)$, $CV_{31}(lt,-)$, $CV_{41}(rt,+)$

Analogously to what has been explained in the example 1.1, during the propagation along the multi-mode optical fiber it is possible to have a power exchange between the circular vortices $CV_{01}(rt,+)$, $CV_{11}(lt,-)$, $CV_{21}(rt,+)$, $CV_{31}(lt,-)$, $CV_{41}(rt,+)$, and the respective opposite circular vortices $CV_{01}(lt,-)$, $CV_{11}(rt,+)$, $CV_{21}(lt,-)$, $CV_{31}(rt,+)$, $CV_{41}(lt,-)$.

Example 2

In this series of examples, set the value of the angular index l and change only the value of the radial index m. Moreover, it is chosen at the transmission side (that is at the input facet of the multi-mode optical fiber) only one circular vortex for equal values of the radial index m and of the angular index l.

Example 2.1

Set the value of the angular index to l=0, and then the values of the radial index m=1, 2, 3, 4, 5 are chosen and thus the circular vortices have a propagation constant β to a first approximation proportional to the value 2*m+0+1=2*m+1: in this case the circular vortices have different propagation constants β because they are to a first approximation proportional to values 3, 5, 7, 9, 11. Moreover, the circular vortices $CV_{0m}(rt,+)$ are chosen (for the same value of m).

Therefore in this example it is possible to inject at the transmission side five modes at the input facet of the multi-mode optical fiber which are the following five circular vortices:

$CV_{01}(rt,+)$, $CV_{02}(rt,+)$, $CV_{03}(rt,+)$, $CV_{04}(rt,+)$, $CV_{05}(rt,+)$

It is observed that during the propagation along the multi-mode optical fiber, it is possible to occur a power exchange between the circular vortices injected at the transmission side and the respective opposite circular vortices, that is:

the circular vortex $CV_{01}(rt,+)$ can exchange power with the circular vortex $CV_{01}(lt,-)$;
the circular vortex $CV_{02}(rt,+)$ can exchange power with the circular vortex $CV_{02}(lt,-)$;
the circular vortex $CV_{03}(rt,+)$ can exchange power with the circular vortex $CV_{03}(lt,-)$;
the circular vortex $CV_{04}(rt,+)$ can exchange power with the circular vortex $CV_{04}(lt,-)$;
the circular vortex $CV_{05}(rt,+)$ can exchange power with the circular vortex $CV_{05}(lt,-)$.

Example 2.2

Set the value of the angular index to l=1, then the values of the radial index m=1, 2, 3, 4, 5 are chosen and thus the circular vortices have a propagation constant β to a first approximation proportional to the value 2*m+1+1=2*m+2: in this case the circular vortices have different propagation constants β because they are to a first approximation proportional to the values 4, 6, 8, 10, 12. Moreover, the circular vortices $CV_{1m}(rt,+)$ are chosen (for the same value of m), that are with a right circular polarization and clockwise screw direction.

Therefore in this example it is in transmission possible to inject five modes at the input facet of the multi-mode optical fiber which are the following five circular vortices:

$CV_{11}(rt,+)$, $CV_{12}(rt,+)$, $CV_{13}(rt,+)$, $CV_{14}(rt,+)$, $CV_{15}(rt,+)$.

It is observed that during the propagation along the multi-mode optical fiber it is possible to have a power exchange between the circular vortices injected at the transmission side and the respective opposite circular vortices, that is:

the circular vortex $CV_{11}(rt,+)$ can exchange power with the circular vortex $CV_{11}(lt,-)$;
the circular vortex $CV_{12}(rt,+)$ can exchange power with the circular vortex $CV_{12}(lt,-)$;
the circular vortex $CV_{13}(rt,+)$ can exchange power with the circular vortex $CV_{13}(lt,-)$;
the circular vortex $CV_{14}(rt,+)$ can exchange power with the circular vortex $CV_{14}(lt,-)$;
the circular vortex $CV_{15}(rt,+)$ can exchange power with the circular vortex $CV_{15}(lt,-)$.

Example 2.3

This example is analogous to example 2.2 (l=1, m=1, 2, 3, 4, 5), with the difference that the circular vortices $CV_{1m}(lt,-)$ are chosen (for a determined value of m), that are with a left circular polarization and counterclockwise screw direction.

Therefore in this example it is possible to inject at the transmission side five modes at the input facet of the multi-mode optical fiber which are the following five circular vortices:

$CV_{11}(lt,-)$, $CV_{12}(lt,-)$, $CV_{13}(lt,-)$, $CV_{14}(lt,-)$, $CV_{15}(lt,-)$.

It is observed that during the propagation over the multi-mode optical fiber, it is possible to have a power exchange between the circular vortices injected at the transmission side and the respective opposite circular vortices, that is:

the circular vortex $CV_{11}(lt,-)$ can exchange power with the circular vortex $CV_{11}(rt,+)$;

the circular vortex $CV_{12}(lt,-)$ can exchange power with the circular vortex $CV_{12}(rt,+)$;

the circular vortex $CV_{13}(lt,-)$ can exchange power with the circular vortex $CV_{13}(rt,+)$;

the circular vortex $CV_{14}(lt,-)$ can exchange power with the circular vortex $CV_{14}(rt,+)$;

the circular vortex $CV_{15}(lt,-)$ can exchange power with the circular vortex $CV_{15}(rt,+)$.

Example 2.4

Set the value of the angular index to l=2, then the values of the radial index m=1, 2, 3, 4, 5 are chosen and thus the circular vortices have a propagation constant β to a first approximation proportional to the value 2*m+2+1=2*m+3; in this case the circular vortices have different propagation constants β because they are to a first approximation proportional to the values 5, 7, 9, 11, 13. Moreover, the circular vortices $CV_{2m}(rt,-)$ are chosen (for the same value of m), having a right circular polarization and a counterclockwise screw direction.

Therefore in this example it is possible to inject at the transmission side five modes at the input facet of the multi-mode optical fiber which are the following five circular vortices:

$CV_{21}(rt,-)$, $CV_{22}(rt,-)$, $CV_{23}(rt,-)$, $CV_{24}(rt,-)$, $CV_{25}(rt,-)$

It is observed that during the propagation along the multi-mode optical fiber it is possible to have a power exchange between the circular vortices injected at the transmission side and the respective opposite circular vortices, that is:

the circular vortex $CV_{21}(rt,+)$ can exchange power with the circular vortex $CV_{21}(lt,-)$;

the circular vortex $CV_{22}(rt,+)$ can exchange power with the circular vortex $CV_{22}(lt,-)$;

the circular vortex $CV_{23}(rt,+)$ can exchange power with the circular vortex $CV_{23}(lt,-)$;

the circular vortex $CV_{24}(rt,+)$ can exchange power with the circular vortex $CV_{24}(lt,-)$;

the circular vortex $CV_{25}(rt,+)$ can exchange power with the circular vortex $CV_{25}(lt,-)$.

Example 2.5

This example is analogous to the example 2.4 (l=2, m=1, 2, 3, 4, 5), with the difference that the circular vortices $CV_{2m}(lt,+)$ are chosen (for a determined value of m), that are with a left circular polarization and a clockwise screw direction.

Therefore in this example it is possible to inject at the transmission side five modes at the input facet of the multi-mode optical fiber which are the following five circular vortices:

$CV_{21}(lt,+)$, $CV_{22}(lt,+)$, $CV_{23}(lt,+)$, $CV_{24}(lt,+)$, $CV_{25}(lt,+)$

It is observed that during the propagation along the multi-mode optical fiber it is possible to have a power exchange between the circular vortices injected at the transmission side and the respective opposite circular vortices, that is:

the circular vortex $CV_{21}(lt,+)$ can exchange power with the circular vortex $CV_{21}(rt,-)$;

the circular vortex $CV_{22}(lt,+)$ can exchange power with the circular vortex $CV_{22}(rt,-)$;

the circular vortex $CV_{23}(lt,+)$ can exchange power with the circular vortex $CV_{23}(rt,-)$;

the circular vortex $CV_{24}(lt,+)$ can exchange power with the circular vortex $CV_{24}(rt,-)$;

the circular vortex $CV_{25}(lt,+)$ can exchange power with the circular vortex $CV_{25}(rt,-)$.

With reference to FIG. 1, it is shown the portion at the transmission side of an optical communication system 1 according to an embodiment of the invention.

The optical communication system 1 comprises an optical transmitter 2 and an optical fiber 40. The optical fiber 40 is substantially circular and furthermore is of multi-mode type, and is capable of carrying a plurality of propagation modes.

The optical transmitter 2 has the function of generating five free space circular vortices CVSL1, CVSL2, CVSL3, CVSL4, CVSL5 and to multiplex them over the multi-mode optical fiber 40 over five transmitted guided circular vortices CVFT1, CVFT2, CVFT3, CVFT4, CVFT5 respectively, which are injected at the input facet of the multi-mode optical fiber 40.

For example, the five transmitted guided circular vortices CVFT1, CVFT2, CVFT3, CVFT4, CVFT5 are those indicated in the example 1.1, that is:

CVFT1=$CV_{01}(rt,+)$;
CVFT2=$CV_{11}(rt,+)$;
CVFT3=$CV_{21}(rt,+)$;
CVFT4=$CV_{31}(rt,+)$;
CVFT5=$CV_{41}(rt,+)$.

Alternatively, the five transmitted guided circular vortices CVFT1, CVFT2, CVFT3, CVFT4, CVFT5 are those of the other examples described above.

It is supposed that the spatial transverse component of the electric field (and of the magnetic one) of the five transmitted guided circular vortices CVFT1, CVFT2, CVFT3, CVFT4, CVFT5 has in the space of cylindrical coordinates (ρ, θ, z) the following terms of radial amplitude and angular phase:

CVFT1: the first radial amplitude term $f1_m(\rho)$ and the first angular phase term $f1_t(\theta)=\exp(\pm i*l*\theta)$;

CVFT2: the second radial amplitude term $f2_m(\rho)$ and the second angular phase term $f2_t(\theta)=\exp(\pm i*l*\theta)$;

CVFT3: the third radial amplitude term $f3_m(\rho)$ and the third angular phase term $f3_t(\theta)=\exp(\pm i*l*\theta)$;

CVFT4: the fourth radial amplitude term $f4_m(\rho)$ and the fourth angular phase term $f4_t(\theta)=\exp(\pm i*l*\theta)$; and CVFT5: the fifth radial amplitude term $f5_m(\rho)$ and the fifth angular phase term $f5_t(\theta)=\exp(\pm i*l*\theta)$.

In particular, the optical transmitter 2 comprises:
an optical source 10;
a holographic mask 11;
an optical polarizer 20; and
an optical element 30.

The optical source 10 comprises five laser sources 5, 6, 7, 8, 9 having the function of generating five free space modulated optical beams F1, F2, F3, F4, F5 of the Gaussian type respectively, that is having a trend of the transverse spatial component of the electric field of the Gaussian type. In particular:

the laser source 5 is such to generate a first free space optical beam F1 of the Gaussian type having a linear polarization state;

the laser source 6 is such to generate a second free space optical beam F2 of the Gaussian type having a linear polarization state;

the laser source 7 is such to generate a third free space optical beam F3 of the Gaussian type having a linear polarization state;

the laser source 8 is such to generate a fourth free space optical beam F4 of the Gaussian type having a linear polarization state; and the laser source 9 is such to generate a fifth free space optical beam F5 of the Gaussian type having a linear polarization state.

In one embodiment, the laser beams F1-F5 are generated from laser sources 5-9 in response to an electrical signal that is applied to the respective laser sources. Namely, an electrical signal carrying data is applied to one or more of the laser sources 5-9 to cause the respective laser source to convert the electrical data signal into an optical signal that contains a representation of that data. The data is carried on the fiber optic cable 40 and converted in the receiver 102 back into an electrical signal that contains the data.

The holographic mask 11 comprises five portions 12, 13, 14, 15, 16 having the function of modifying the characteristics of the five free space modulated optical beams F1, F2, F3, F4, F5, by generating five free space optical vortices V1, V2, V3, V4, V5 respectively. While in one embodiment the optical beams are free space optical beams, it is not necessary that the optical vortices V1-V5 be of the free space type (nor for the optical beams F1-F5 to be of the free space type), but rather, in one embodiment, the optical vortices V1-V5 and the subsequent circular vortices are not of the free space type. They might be of the type, for example, that propagates in a semiconductor chip or an optical transmission line.

The term "optical vortices" means a trend of the electromagnetic field wherein the surface of the wavefront of the transverse spatial component of the electric $E_t$ (and magnetic $H_t$) field has a screw trend, clockwise or counterclockwise. Therefore the distribution in the space of cylindrical coordinates ($\rho$, $\theta$, z) of the transverse component $E_t$ of the electric (and magnetic) field of the free space optical vortices depends on the type $g_m(\rho)*\exp(\pm i*l*\theta)*\exp(-i*\beta*z)$, wherein z is the main axis of propagation of the electromagnetic field.

In particular: the portion 12 is such to receive the first optical beam F1 of the Gaussian type and is such to generate a first free space optical vortex V1. Specifically, the portion 12 is such to modify the radial term of the transverse component of the electric field (and of the magnetic one) of the first optical beam F1 so that the radial term of the transverse component of the electric (and magnetic) field of the first free space optical vortex V1 has a trend equal to the radial term $f1_m(\rho)$ of the first transmitted guided circular vortex CVFT1. Moreover, the portion 12 is such to modify the angular phase term of the transverse component of the electric (and magnetic) field of the first optical beam F1 so that the angular phase term of the transverse component of the electric (and magnetic) field of the first free space optical vortex V1 has a trend equal to the angular phase term $f1_f(\theta)$ (clockwise or counterclockwise) of the first transmitted guided circular vortex CVFT1.

The portion 13 is such to receive the second optical beam F2 of the Gaussian type and is such to generate a second free space optical vortex V2. Particularly, the portion 13 is such to modify the radial term of the transverse component of the electric (and magnetic) field of the second optical beam F2 so that the radial term of the transverse component of the electric (and magnetic) field of the second free space optical vortex V2 has a trend equal to the radial term $f2_m(\rho)$ of the second transmitted guided circular vortex CVFT2. Moreover, the portion 13 is such to modify the angular phase term of the transverse component of the electric (and magnetic) field of the second optical beam F2 so that the angular phase term of the transverse component of the electric (and magnetic one) field of the second free space optical vortex V2 has a trend equal to the angular phase term $f2_f(\theta)$ (clockwise or counterclockwise) of the second transmitted guided circular vortex CVFT2.

The portion 14 is such to receive the third optical beam F3 of the Gaussian type and is such to generate a third free space optical vortex V3. In particular, the portion 14 is such to modify the radial term of the transverse component of the electric (and magnetic) field of the third optical beam F3 so that the radial term of the transverse component of the electric (and magnetic) field of the third free space optical vortex V3 has a trend identical to the radial term $f3_m(\rho)$ of the third transmitted guided circular vortex CVFT3. Moreover, the portion 14 is such to modify the angular phase term of the transverse component of the electric (and magnetic) field of the third optical beam F3 so that the angular phase term of the transverse component of the electric (and magnetic) field of the third free space optical vortex V3 has a trend equal to the angular phase term $f3_f(\theta)$ (clockwise or counterclockwise) of the third transmitted guided circular vortex CVFT3.

The portion 15 is such to receive the fourth optical beam F4 of the Gaussian type and is such to generate a fourth free space optical vortex V4. In particular, the portion 15 is such to modify the radial term of the transverse component of the electric (and magnetic) field of the fourth optical field F4 so that the radial term of the transverse component of the electric (and magnetic) field of the fourth free space optical vortex V4 has a trend equal to the radial term $f4_m(\rho)$ of the fourth transmitted guided circular vortex CVFT4. Moreover, the portion 15 is such to modify the angular phase term of the transverse component of the electric (and magnetic) field of the fourth optical beam F4 so that the angular phase term of the transverse component of the electric (and magnetic) field of the fourth free space optical vortex V4 has a trend identical to the angular phase term $f4_f(\theta)$ (clockwise or counterclockwise) of the fourth transmitted guided circular vortex CVFT4.

The portion 16 is such to receive the fifth optical beam F5 of the Gaussian type and is such to generate a fifth free space optical vortex V5. In particular, the portion 16 is such to modify the radial term of the transverse component of the electric (and magnetic) field of the fifth optical field F5 so that the radial term of the transverse component of the electric (and magnetic) field of the fifth free space optical vortex V5 has a trend equal to the radial term $f5_m(\rho)$ of the fifth transmitted guided circular vortex CVFT5. Moreover, the portion 16 is such to modify the angular phase term of the transverse component of the electric (and magnetic) field of the fifth optical beam F5 so that the angular phase term of the transverse component of the electric (and magnetic) field of the fifth free space optical vortex V5 has a trend equal to the angular phase term $f5_f(\theta)$ (clockwise or counterclockwise) of the fifth transmitted guided circular vortex CVFT5.

The optical polarizer 20, for example a quarter wave plate 20, is such to change the polarization state of the five free space optical vortices V1, V2, V3, V4, V5, by generating five free space circular vortices CVSL1, CVSL2, CVSL3, CVSL4, CVSL5. As mentioned previously, in one embodiment, the circular vortices are not of the free space type. They might, for example, be of the type to be input to a fiber optic cable or other optical transmission line, a semiconductor chip, or the like.

The term "circular vortices" means a trend of the electromagnetic field wherein:

the transverse spatial component of the electric (and magnetic) field has a uniform polarization state of the right or left circular type;

the surface of the wavefront of the transverse spatial component of the electric (and magnetic) field has a screw trend, clockwise or counterclockwise.

In particular, the optical polarizer 20 is such to receive the first free space optical vortex V1, is such to change the polarization state of the first free space optical vortex V1 from linear to circular (right or left) and is such to generate the first free space circular vortex CVSL1, wherein the transverse component of the electric (and magnetic) field has a (right or left) circular polarization state, has the radial term equal to the first radial term $f1_m(\rho)$ and has the angular phase term equal to the first angular phase term $f1_f(\theta)$ (clockwise or counterclockwise).

Moreover, the optical polarizer 20 is such to receive the second free space optical vortex V2, is such to change the polarization state of the second free space optical vortex V2 from linear to (right or left) circular and is such to generate the second free space circular vortex CVSL2 wherein the transverse component of the electric (and magnetic) field has a (right or left) circular polarization state, has the radial term equal to the second radial term $f2_m(\rho)$ and has the angular phase term equal to the second angular phase term $f2_f(\theta)$ (clockwise or counterclockwise).

Moreover, the optical polarizer 20 is such to receive the third free space optical vortex V3, is such to change the polarization state of the third free space optical vortex V3 from linear to (right or left) circular and is such to generate the third free space circular vortex CVSL3 wherein the transverse component of the electric (and magnetic) field has a (right or left) circular polarization state, has the radial term equal to the third radial term $f3_m(\rho)$ and has the angular phase term equal to the third angular phase term $f3_f(\theta)$ (clockwise or counterclockwise).

Moreover, the optical polarizer 20 is such to receive the fourth free space optical vortex V4, is such to change the polarization state of the fourth free space optical vortex V4 from linear to (right or left) circular and is such to generate the fourth free space circular vortex CVSL4 wherein the transverse component of the electric (and magnetic) field has a (right or left) circular polarization state, has the radial term equal to the fourth radial term $f4_m(\rho)$ and has the angular phase term equal to the fourth angular phase term $f4_f(\theta)$ (clockwise or counterclockwise).

Finally, the optical polarizer 20 is such to receive the fifth free space optical vortex V5, is such to change the polarization state of the fifth free space optical vortex V5 from linear to (right or left) circular and is such to generate the fifth free space circular vortex CVSL5 wherein the transverse component of the electric (and magnetic) field has a (right or left) circular polarization state, has the radial term equal to the fifth radial term $f5_m(\rho)$ and has the angular phase term equal to the fifth angular phase term $f5_f(\theta)$ (clockwise or counterclockwise).

Therefore the set of the optical source 10, of the holographic mask 11 and of the optical polarizer 20 forms a generator having the function of generating a plurality of free space circular vortices CVSL1, CVSL2, CVSL3, CVSL4, CVSL5, or alternatively circular vortices CVSL1-CVSL5 that are not of the free space type.

The optical element 30, for example of the diffractive/refractive type, has the function of coupling the circular vortices CVSL1, CVSL2, CVSL3, CVSL4, CVSL5 at the input facet of the multi-mode optical fiber 40. In one embodiment, the optical diffractive/refractive element 30 is such to receive the first free space circular vortex CVSL1, the second free space circular vortex CVSL2, the third free space circular vortex CVSL3, the fourth free space circular vortex CVSL4, the fifth free space circular vortex CVSL5 and is such to multiplex them over the multi-mode optical fiber 40. In particular, the optical diffractive/refractive element 30 is such to couple:

the first free space circular vortex CVSL1 with the first transmitted guided circular vortex CVFT1;

the second free space circular vortex CVSL2 with the second transmitted guided circular vortex CVFT2;

the third free space circular vortex CVSL3 with the third transmitted guided circular vortex CVFT3;

the fourth free space circular vortex CVSL4 with the fourth transmitted guided circular vortex CVFT4; and the fifth free space circular vortex CVSL5 with the fifth transmitted guided circular vortex CVFT5.

The laser sources can be of the DFB (Distributed Feed-Back) type or of the ECL (External Cavity Laser) type.

Advantageously, the laser sources 5, 6, 7, 8, 9 are of the VCSEL (Vertical Cavity Surface Emitting Laser) type. In this way the structure emitting the optical beam F1 has the same circular symmetry as the multi-mode optical fiber 40 and this contributes to the coupling between the free space circular vortex CVSL1 and the multi-mode optical fiber 40 (analogously for F2, F3, F4, F5 and the free space circular vortices CVSL2, CVSL3, CVSL4, CVSL5). Moreover, the VCSEL type laser sources 5, 6, 7, 8, 9 have the advantage that they can be directly modulated and they can be arranged in a compact array: in this way it is possible to obtain an optical transmitter 2 with reduced size, cheap and with low consumption, which thus can be used in applications requiring a high bit rate (not obtainable by a mono-mode fiber), such as for example in applications for transmitting data along short distance (for example, for locally connecting network apparatuses which are separated each other or for connecting boards of the same network apparatus) and for the data transmission over short and intermediate distance telecommunication networks.

Preferably, the five portions 12, 13, 14, 15, 16 are obtained by suitable holograms generated by a computer (for example, a personal computer) and said holograms are written by standard lithographic technologies, such as the laser beam lithography or electronic beam lithography.

It is observed that for the sake of simplicity in FIG. 1 it has been considered the case of five laser sources, but more in general the invention can be applied to a number of laser sources greater than or equal to 2.

Figure 2:
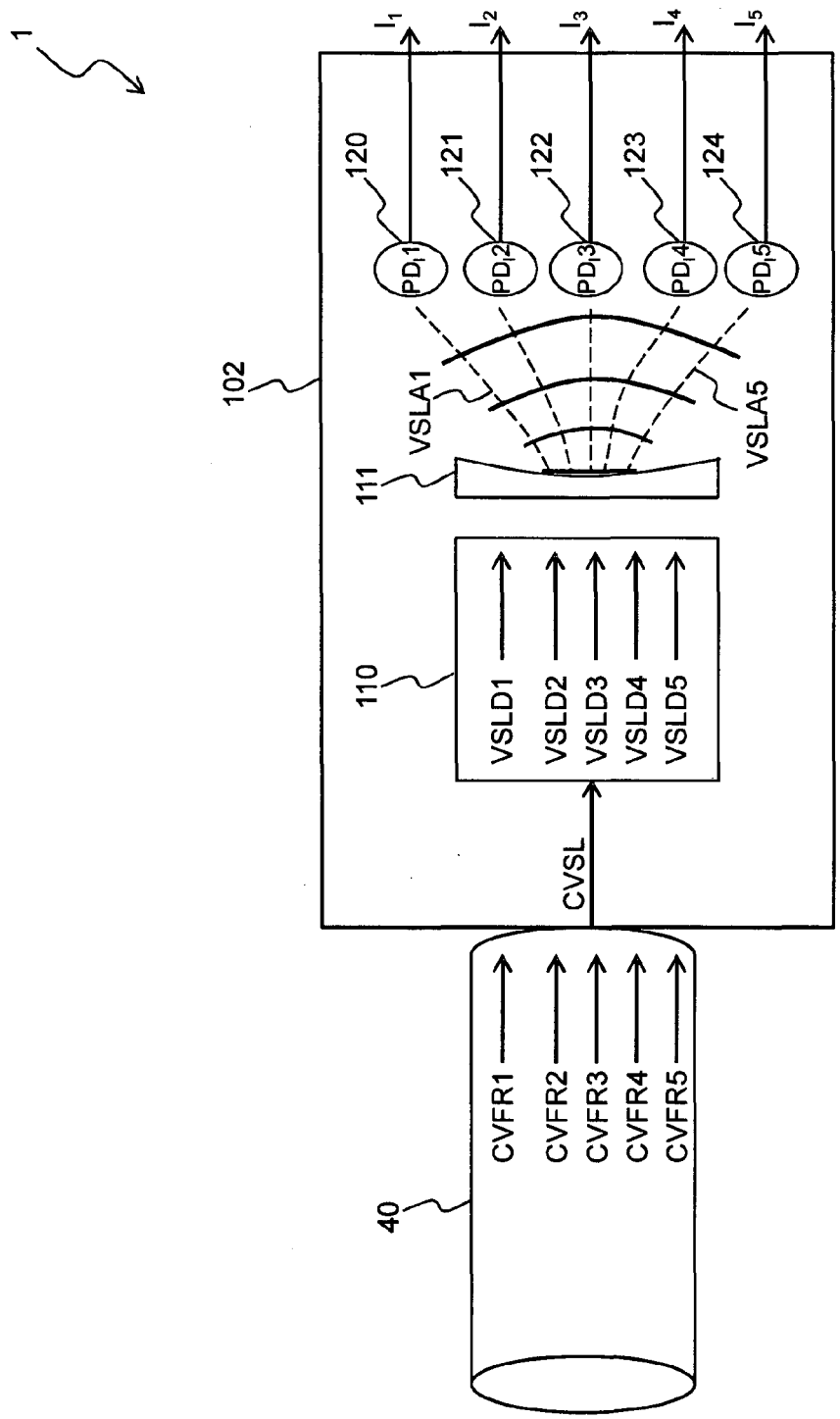
FIG. 2 schematically shows an incoherent optical receiver according to an embodiment of the invention.

With reference to FIG. 2, it is shown the reception portion of the optical communication system 1 according to an embodiment of the invention.

The optical communication system 1 comprises the multi-mode optical fiber 40 and an optical receiver 102 having a detecting scheme of the incoherent type.

The multi-mode optical fiber 40 is such to receive at the input face the five transmitted guided circular vortices CVFT1, CVFT2, CVFT3, CVFT4, CVFT5, is such to propagate them along axis z of the multi-mode optical fiber 40 and is such to have at the output face five received guided circular vortices CVFR1, CVFR2, CVFR3, CVFR4, CVFR5.

It is observed that in case of a perfectly circular multi-mode optical fiber 40 and which is not affected by external perturbations, the five received guided circular vortices CVFR1, CVFR2, CVFR3, CVFR4, CVFR5 have a trend in the cylindrical space similar to the one of the five transmitted guided circular vortices CVFT1, CVFT2, CVFT3, CVFT4, CVFT5, except for the attenuation experienced during the propagation along the multi-mode optical fiber 40.

In the real case wherein the multi-mode optical fiber 40 is not perfectly circular and in case it is not affected by external perturbations, the five transmitted guided circular vortices CVFT1, CVFT2, CVFT3, CVFT4, CVFT5 exchange power with the respective opposite guided circular vortices CVFTO1, CVFTO2, CVFTO3, CVFTO4, CVFTO5. In this case, the five received guided circular vortices CVFR1, CVFR2, CVFR3, CVFR4, CVFR5 have a trend in the cylindrical space which is a linear combination of the five transmitted guided circular vortices CVFT1, CVFT2, CVFT3, CVFT4, CVFT5 (except for the attenuation) and of the corresponding five opposite guided circular vortices CVFTO1, CVFTO2, CVFTO3, CVFTO4, CVFTO5 (except for the attenuation), that is:

- the first received guided circular vortex CVFR1 is a linear combination of the transmitted guided circular vortex CVFT1 (except for the attenuation) and of its opposite guided circular vortex CVFTO1 (except for the attenuation);
- the second received guided circular vortex CVFR2 is a linear combination of the transmitted guided circular vortex CVFT2 (except for the attenuation) and of its opposite guided circular vortex CVFTO2 (except for the attenuation);
- the third received guided circular vortex CVFR3 is a linear combination of the transmitted guided circular vortex CVFT3 (except for the attenuation) and of its opposite guided circular vortex CVFTO3 (except for the attenuation);
- the fourth received guided circular vortex CVFR4 is a linear combination of the transmitted guided circular vortex CVFT4 (except for the attenuation) and of its opposite guided circular vortex CVFTO4 (except for the attenuation); and
- the fifth received guided circular vortex CVFR5 is a linear combination of the transmitted guided circular vortex CVFT5 (except for the attenuation) and of its opposite guided circular vortex CVFTO5 (except for the attenuation).

The optical receiver 102 comprises:

- a volume diffraction grating 110;
- a refractive optical element 111; and
- five photo-detectors 120, 121, 122, 123, 124.

The diffraction grating 110 has the function of angularly separating the five received guided circular vortices CVFR1, CVFR2, CVFR3, CVFR4, CVFR5, by generating (from the optical signal CVSL transmitted by the output facet of the multi-mode optical fiber 40) five respective diffracted free space optical vortices VSLD1, VSLD2, VSLD3, VSLD4, VSLD5, which can be diffracted with angles different from each other. The signals VSLD1-VSLD5 are not required to be of the free space type, and, in one alternative embodiment, they are not. The same description provided herein for both transmitting and receiving the free space optical signals also applies to the type of signals that are not free space. In one embodiment, the first diffracted free space optical vortex VSLD1 is correlated only to the first received guided circular vortex CVFR1, the second diffracted free space optical vortex VSLD2 is correlated only to the second received guided circular vortex CVFR2, the third diffracted free space optical vortex VSLD3 is correlated only to the third received guided circular vortex CVFR3, the fourth diffracted free space optical vortex VSLD4 is correlated only to the fourth received guided circular vortex CVFR4 and the fifth diffracted free space optical vortex VSLD5 is correlated only to the fifth received guided circular vortex CVFR5. This has the advantage of performing a selective division of the optical signal received at the output facet of the multi-mode optical fiber 40, thus reducing the loss of the useful signal.

It is also observed that the five diffracted free space optical vortices VSLD1, VSLD2, VSLD3, VSLD4, VSLD5 can be each one a linear combination of optical vortices opposite each other.

The refractive optical element 111, for example a diverging lens, has the function of increasing the angular separation between the diffracted free space optical vortices VSLD1, VSLD2, VSLD3, VSLD4, VSLD5, generating therefrom five angularly amplified free space optical vortices VSLA1, VSLA2, VSLA3, VSLA4, VSLA5 respectively. It is observed that also the five angularly amplified free space optical vortices VSLA1, VSLA2, VSLA3, VSLA4, VSLA5 can be each one a linear combination of free space optical vortices opposite each other.

Therefore the diffraction grating 110 together with the refractive optical element 111 have the function of performing a mode demultiplexing, that is the function of separating the modes one from the other (that is the circular vortices) which have been multiplexed together for being carried over the multi-mode optical fiber 40.

The five photo-detectors 120, 121, 122, 123, 124, for example five photo-diodes, have the function of detecting the five angularly amplified free space vortices VSLA1, VSLA2, VSLA3, VSLA4, VSLA5 respectively and of converting them into five electrical signals (for example, currents) $I_1, I_2, I_3, I_4, I_5$ respectively. It is observed that the five electrical signals $I_1, I_2, I_3, I_4, I_5$ can be each one the optical-electrical conversion of a linear combination of vortices opposite each other.

It is observed that the optical receiver 102 is such to perform no distinctions between opposite circular vortices. In fact, the photo-detector 120 is such to detect the optical signal carrying the first angularly amplified free space vortex VSLA1, which can be also a combination of free space vortices opposite each other. Similar considerations can be applied to the photo-detectors 121, 122, 123, 124 in relation with the angularly amplified free space vortices VSLA2, VSLA3, VSLA4, VSLA5 respectively. In this way it is possible to recover, at the reception side, the maximum optical power of the useful signal, because the transmitted power can be exchanged between the circular vortex injected at the transmission side at the input facet of the multi-mode optical fiber 40 and its opposite circular vortex excited into the multi-mode optical fiber 40.

Figure 3A:
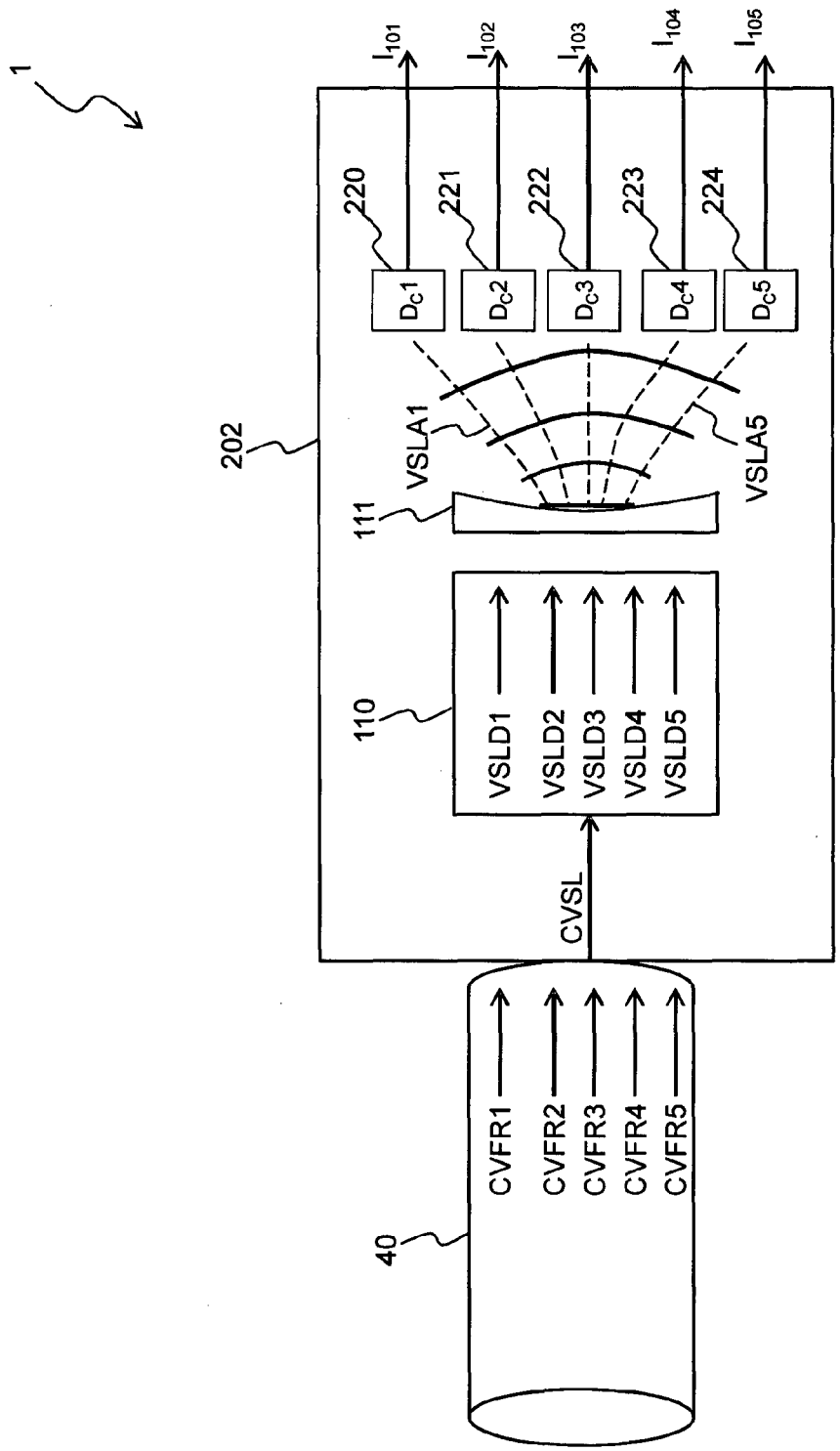
FIG. 3A schematically shows a coherent optical receiver according to a first variant of the embodiment of the invention.

With reference to FIG. 3A, it is shown the reception portion of the optical communication system 1 according to a first variant of the embodiment of the invention.

The optical communication system 1 comprises the multi-mode optical fiber 40 and an optical receiver 202 having a coherent-type detection scheme, which allows to recover the information transmitted with a signal/noise ratio smaller than the one of the previous incoherent-type detection scheme.

It is observed that blocks identical or analogous to the ones shown in FIGS. 2 and 3A have the same numerical references.

The optical receiver 202 differs from the optical receiver 102 for the presence of the coherent optical detection modules 220, 221, 222, 223, 224 replacing the photo-detectors 120, 121, 122, 123, 124 respectively.

The coherent optical detection module 220 is such to receive the first angularly amplified free space vortex VSLA1 and to generate therefrom a first current signal $I_{101}$.

The coherent optical detection module 221 is such to receive the second angularly amplified free space vortex VSLA2 and to generate therefrom a second current signal $I_{102}$.

The coherent optical detection module 222 is such to receive the third angularly amplified free space vortex VSLA3 and to generate therefrom a third current signal $I_{103}$.

The coherent optical detection module 223 is such to receive the fourth angularly amplified free space vortex VSLA4 and to generate therefrom a fourth current signal $I_{104}$.

The coherent optical detection module 224 is such to receive the fifth angularly amplified free space vortex VSLA5 and to generate therefrom a fifth current signal $I_{105}$.

Figure 3B:
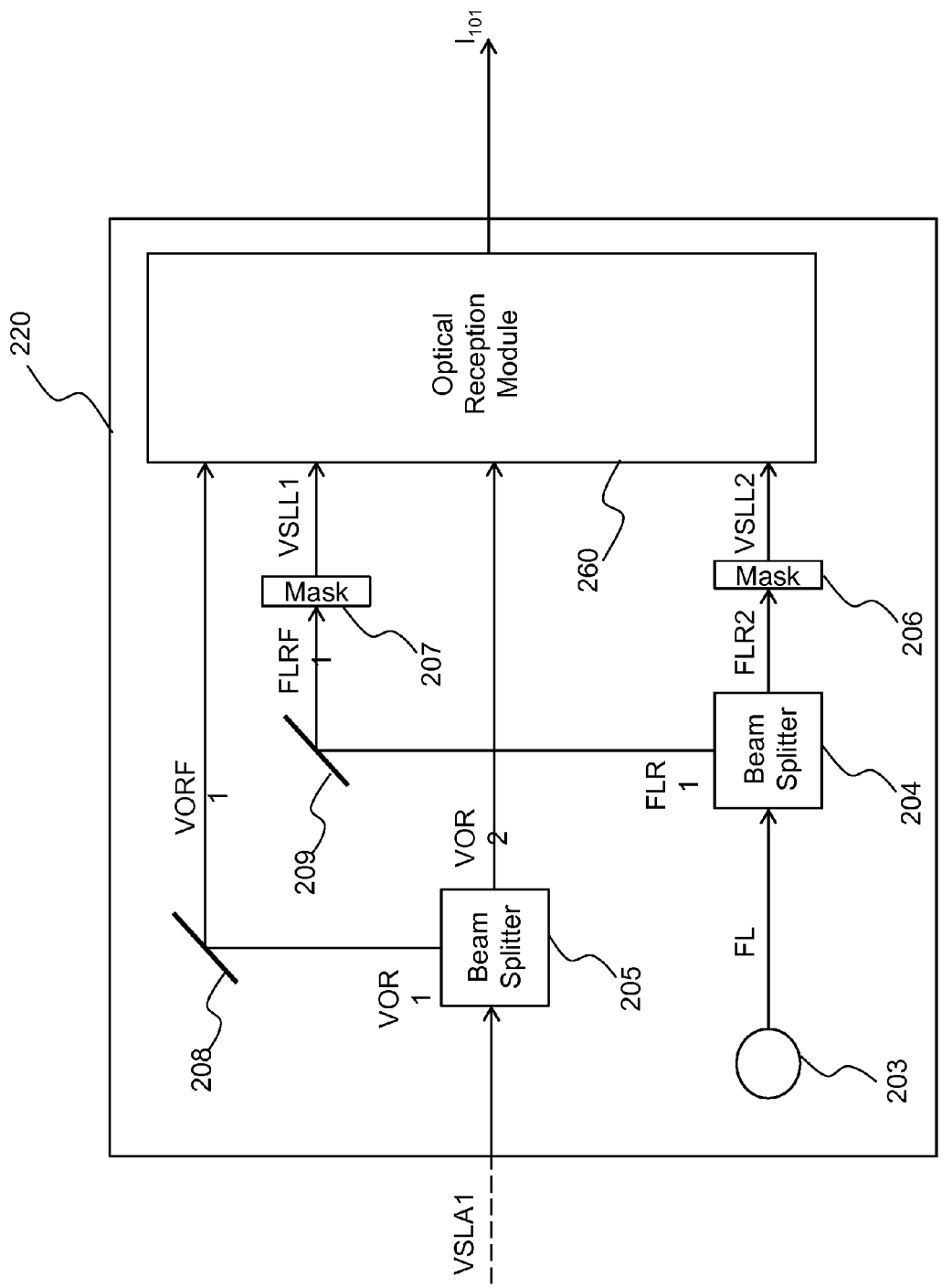
FIG. 3B shows more in detail a coherent optical detecting module of the first variant of the embodiment of the invention.

Referring to FIG. 3B, it is shown more in detail the coherent optical detection module 220. In particular, the coherent optical detection module 220 comprises:

a first optical beam splitter 205;
a first mirror 208;
a laser-type local oscillator 203;
a second optical beam splitter 204;
a second mirror 209;
a first holographic mask 207;
a second holographic mask 206;
an optical reception module 260.

The first optical beam splitter 205 is such to receive the first angularly amplified free space optical vortex VSLA1 (or a combination of the first angularly amplified free space optical vortex and its opposite optical vortex) and to replicate it in a first replicated optical vortex VOR1 and in a second replicated optical vortex VOR2.

The first mirror 208 is such to receive the first replicated optical vortex VOR1 and to reflect it towards the optical reception module 260, in order to form a first reflected optical vortex VORF1.

The laser-type local oscillator 203 is such to generate a local laser beam FL.

The second optical beam splitter 204 is such to receive the local laser beam FL and to replicate it in a first replicated laser beam FLR1 and in a second replicated laser beam FLR2.

The second mirror 209 is such to receive the first replicated laser beam FLR1 and to reflect it towards the first holographic mask 207, in order to form a first reflected laser beam FLRF1.

The first holographic mask 207 is such to receive the first reflected laser beam FLRF1 and is such to convert it into a suitable first free space local optical vortex VSLL1, for example by means of holograms generated by a computer and implemented with lithographic techniques. In particular, the first free space local optical vortex VSLL1 has a trend of the electro-magnetic field similar to the one of the first angularly amplified free space vortex VSLA1 (and thus similar to the one of the first replicated optical vortex VOR1 and of the first reflected optical vortex VORF1).

The second holographic mask 206 is such to receive the second replicated laser beam FLRF2 and is such to convert it into a suitable second free space local optical vortex VSLL2, for example by holograms generated by a computer and implemented with lithographic techniques. In particular, the second free space local optical vortex VSLL2 has a trend in the electro-magnetic field similar to the one of the vortex opposite to the first angularly amplified free space vortex VSLA1 (and thus similar to the one of the vortex opposite to the second replicated optical vortex VOR2).

Therefore also the first free space local optical vortex VSLL1 and the second free space local optical vortex VSLL2 are optical vortices opposite each other, that is they are modes having the same propagation constant $\beta$ and have the surface of the wavefront of the transverse spatial component of the electric $E_t$ (and magnetic $H_t$) field having an opposite screw trend (that is VSLL1 is clockwise and VSLL2 is counterclockwise, or vice versa).

The optical reception module 260 is such to receive the first reflected optical vortex VORF1, is such to receive the first free space local optical vortex VSLL1 and is such to mix (for example, with a semi-transparent mirror, with a coupler or with an hybrid) the first reflected optical vortex VORF1 with the first free space local optical vortex VSLL1 as described in the paper A. W. Davis et al., "Phase diversity techniques for coherent optical receivers", Journal of Lightwave Technology, LT-5, 4, 561 (1987) and as described in the paper G. Li, "Recent advances in coherent optical communication", Advances in Optics and Photonics, 1, 279 (2009): in this way it is recovered, at the reception side, the information sent, at the transmission side, over the first transmitted guided circular vortex CVFT1 and partially received, at the reception side, over the first received guided circular vortex CVFR1.

Analogously, the optical reception module 260 is such to receive the second reflected optical vortex VORF2, is such to receive the second free space local optical vortex VSLL2 and is such to mix (for example, with a semi-transparent mirror, with a coupler or with an hybrid) the second reflected optical vortex VORF2 with the second free space local optical vortex VSLL2 as described in the above mentioned papers: in this way it is recovered, at the reception side, the information sent, at the transmission side, over the first transmitted guided circular vortex CVFT1 and partially received, at the reception side, over the guided circular vortex opposite to the first received guided circular vortex CVFR1.

It is observed that the optical receiver 202 is such to perform a distinction between opposite circular vortices. In fact, the coherent optical detection module 220 is such to generate locally the first free space local optical vortex VSLL1 and the second free space local optical vortex VSLL2, which are opposite vortices, in order to recover both the useful signal received from the first guided circular vortex CVFR1 and the useful signal received from the guided circular vortex opposite to the first received guided circular vortex CVFR1 respectively.

The previous considerations regarding the coherent detection optical module 220 can be similarly applied to the coherent detection modules 221, 222, 223, 224.

Figure 4:
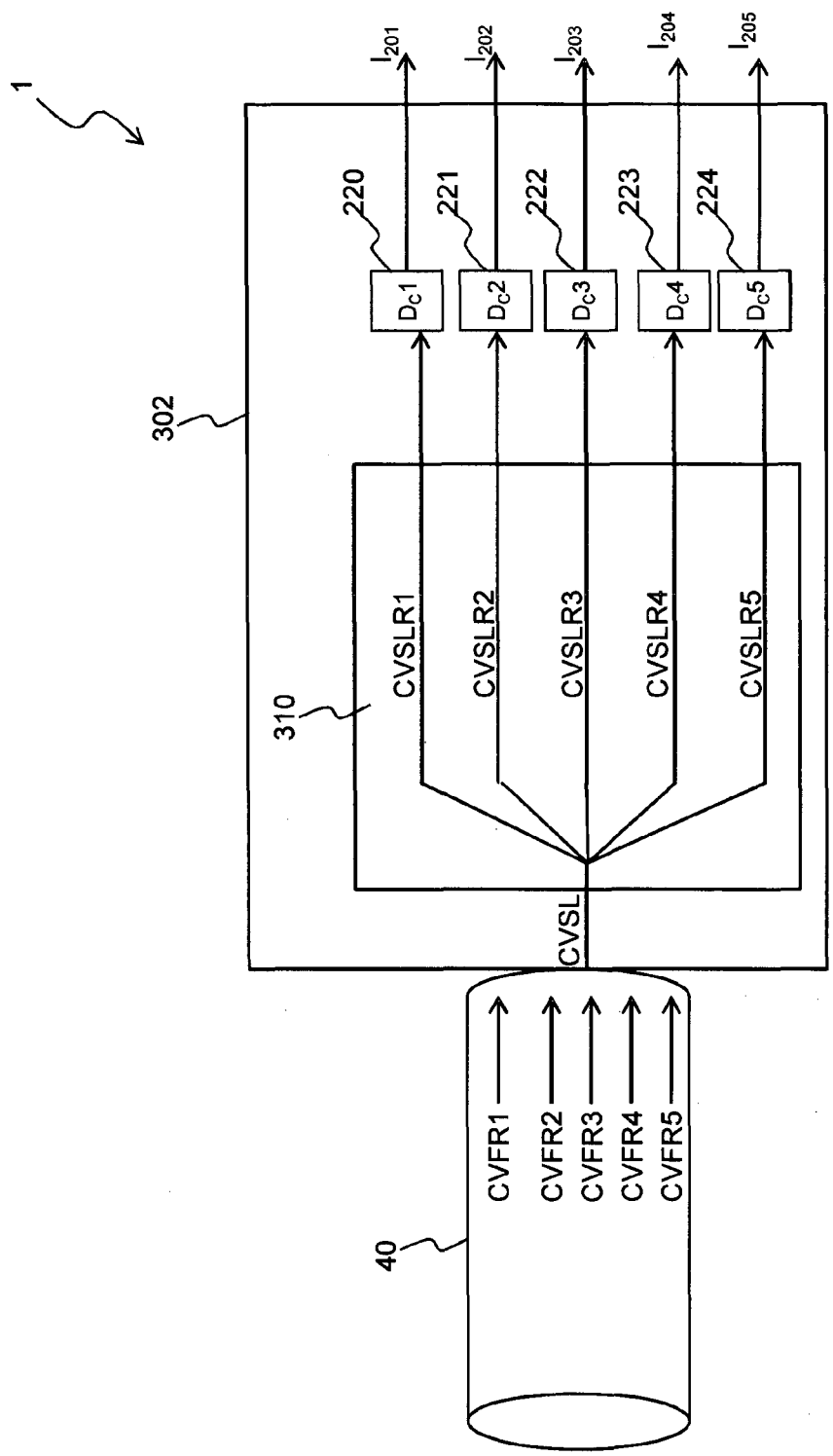
FIG. 4 schematically shows a coherent optical receiver according to a second variant of the embodiment of the invention.

With reference to FIG. 4, it is shown the portion at the reception side of the optical communication system 1 according to second variant of the embodiment of the invention.

It is observed that identical or analogous blocks are indicated in FIGS. 3A and 4 with the same numerical references.

The optical receiver 302 differs from the optical receiver 202 in the presence of an optical beam splitter 310 replacing the diffraction grating 110.

The optical beam splitter 310 is such to receive the optical signal CVSL transmitted by the output facet of the multi-mode optical fiber 40 and is such to replicate it into five replicated free space circular vortices CVSLR1, CVSLR2, CVSLR3, CVSLR4, CVSLR5. It is observed that (unlike the prior embodiments of the invention) each one of the five free space replicated circular vortices CVSLR1, CVSLR2, CVSLR3, CVSLR4, CVSLR5 is correlated to all the five received guided circular vortices CVFR1, CVFR2, CVFR3, CVFR4, CVFR5 (and eventually is correlated also to the guided circular vortices opposite to all the five received guided circular vortices CVFR1, CVFR2, CVFR3, CVFR4, CVFR5).

The coherent optical detection module 220 is such to receive the first free space replicated circular vortex CVSLR1 and to generate therefrom a current signal $I_{201}$.

The coherent optical detection module 221 is such to receive the second free space replicated circular vortex CVSLR2, and to generate therefrom a current signal $I_{202}$.

The coherent optical detection module 222 is such to receive the third free space replicated circular vortex CVSLR3, and to generate therefrom a current signal $I_{203}$.

The coherent optical detection module 223 is such to receive the fourth free space replicated circular vortex CVSLR4, and to generate therefrom a current signal $I_{204}$.

The coherent optical detection module 224 is such to receive the fifth free space replicated circular vortex CVSLR5, and to generate therefrom a current signal $I_{205}$.

The operation of the coherent optical detection module 220 is analogous to the one explained in the description concerning FIG. 3B, with the difference that the first optical beam splitter 205 is such to replicate the first free space replicated circular vortex CVSLR1 into a replicated circular vortex CVOR1 and into a second replicated circular vortex CVOR2, which (unlike the embodiment of the invention and its first variant) are correlated to all the five received guided circular vortices CVFR1, CVFR2, CVFR3, CVFR4, CVFR5 (and eventually are also correlated to the guided circular vortices opposite to the five received guided circular vortices CVFR1, CVFR2, CVFR3, CVFR4, CVFR5).

The considerations regarding the operation of the coherent optical detection module 220 can be applied in the same way to the coherent optical detection modules 221, 222, 223, 224.

It will be now described the operation of the optical transmission system 1 according to the embodiment of the invention, with reference to FIGS. 1 and 2.

It is assumed to consider the example 1.1, wherein the value of the radial index m=1, the value of the angular index l=0, 1, 2, 3, 4 and the circular vortices $CV_{l1}(rt,+)$ are chosen, that is with a clockwise and counterclockwise circular polarization.

At the starting instant $t_0$ the laser source 5 generates the first free space optical beam F1 of the Gaussian-type having a linear polarization state, the laser source 6 generates the second free space optical beam F2 of the Gaussian-type having a linear polarization state, the laser source 7 generates the third free space optical beam F3 of the Gaussian-type having a linear polarization state, the laser source 8 generates the fourth free space optical beam F4 of the Gaussian-type having a linear polarization state and the laser source 9 generates the fifth free space optical beam F5 of the Gaussian-type having a linear polarization state.

At instant $t_1$ (after instant $t_0$) the portion 12 of the holographic mask 11 receives the first free space optical beam F1 and generates therefrom the first free space optical vortex V1 having the transverse component of the electric field (and of the magnetic one) with a radial term $f1_1(\rho)$ and an angular phase term $f1_0(\theta)$.

Further, the portion 13 of the holographic mask 11 receives the second free space optical beam F2 and generates therefrom the second free space optical vortex V2, having the transverse component of the electric (and magnetic) field with a radial term $f2_1(\rho)$ and an angular phase term $f2_1(\theta)$.

Moreover, the portion 14 of the holographic mask 11 receives the third free space optical beam F3 and generates therefrom the third free space optical vortex V3, having the transverse component of the electric (and magnetic) field with a radial term $f3_1(\rho)$ and an angular phase term $f3_2(\theta)$.

Moreover, the portion 15 of the holographic mask 11 receives the fourth free space optical beam F4 and generates therefrom the fourth free space optical vortex V4, having the transverse component of the electric (and magnetic) field with a radial term $f4_1(\rho)$ and an angular phase term $f4_3(\theta)$.

Moreover, the portion 16 of the holographic mask 11 receives the fifth free space optical beam F5 and generates therefrom the fifth free space optical vortex V5, having the transverse component of the electric (and magnetic) field with a radial term $f5_1(\rho)$ and an angular phase term $f5_4(\theta)$.

At instant $t_2$ (subsequent to instant $t_1$) the optical polarizer 20 receives the first free space optical vortex V1 and generates therefrom the first free space circular vortex CVSL1 having the transverse component of the electric (and magnetic) field having a circular polarization state, having a radial term $f1_1(\rho)$ and an angular phase term $f1_0(\theta)$.

Moreover, the optical polarizer 20 receives the second free space optical vortex V2 and generates therefrom the second free space circular vortex CVSL2 having the transverse component of the electric (and magnetic) field having a circular polarization state, with a radial term $f2_1(\rho)$ and an angular phase term $f2_1(\theta)$.

Moreover, the optical polarizer 20 receives the third free space optical vortex V3 and generates therefrom the third free space circular vortex CVSL3 having the transverse component of the electric (and magnetic) field having a circular polarization state, with a radial term $f3_1(\rho)$ and an angular phase term $f3_2(\theta)$.

Moreover, the optical polarizer 20 receives the fourth free space optical vortex V4 and generates therefrom the fourth free space circular vortex CVSL4 having the transverse component of the electric (and magnetic) field having a circular polarization state, with a radial term $f4_1(\rho)$ and an angular phase term $f4_3(\theta)$.

Moreover, the optical polarizer 20 receives the fifth free space optical vortex V5 and generates therefrom the fifth free space circular vortex CVSL5 having the transverse component of the electric (and magnetic) field having a circular polarization state, with a radial term $f5_1(\rho)$ and an angular phase term $f5_4(\theta)$.

At the instant $t_3$ (subsequent to instant $t_2$) the diffractive/refractive optical element 30 receives the first free space circular vortex CVSL1, receives the second free space circular vortex CVSL2, receives the third free space circular vortex CVSL3, receives the fourth free space circular vortex CVSL4, receives the fifth free space circular vortex CVSL5 and multiplex CVSL1, CVSL2, CVSL3, CVSL4, CVSL5 in the multi-mode optical fiber 40.

At instant $t_4$ (subsequent to instant $t_3$) the multi-mode optical fiber 40 receives at the input face the first free space circular vortex CVSL1 and generates therefrom the first transmitted guided circular vortex $CVFT1=CV_{01}(rt,+)$ having a propagation constant $\beta_1$ proportional to the value 3 and having the transverse component of the electric (and magnetic) field with a radial term $f1_1(\rho)$ and an angular phase term $f1_0(\theta)$.

Moreover, the multi-mode optical fiber 40 receives at the input face the second free space circular vortex CVSL2 and generates therefrom the second transmitted guided circular vortex CVFT2=$CV_{11}$(rt,+) having the propagation constant $\beta_2$ proportional to the value 4 and having the transverse component of the electric (and magnetic) field with a radial term $f2_1(\rho)$ and an angular phase term $f2_1(\theta)$.

Moreover, the multi-mode optical fiber 40 receives at the input face the third free space circular vortex CVSL3 and generates therefrom the third transmitted guided circular vortex CVFT3=$CV_{21}$(rt,+) having the propagation constant $\beta_3$ proportional to the value 5 and having the transverse component of the electric (and magnetic) field with a radial term $f3_1(\rho)$ and an angular phase term $f3_2(e)$.

Moreover, the multi-mode optical fiber 40 receives at the input face the fourth free space circular vortex CVSL4 and generates therefrom the fourth transmitted guided circular vortex CVFT4=$CV_{31}$(rt,+) having the propagation constant $\beta_4$ proportional to the value 6 and having the transverse component of the electric (and magnetic) field with a radial term $f4_1(\rho)$ and an angular phase term $f4_3(\theta)$.

Moreover, the multi-mode optical fiber 40 receives at the input face the fifth free space circular vortex CVSL5 and generates therefrom the fifth transmitted guided circular vortex CVFT5=$CV_{41}$(rt,+) having a propagation constant $\beta_5$ proportional to the value 7 and having the transverse component of the electric (and magnetic) field with a radial term $f5_1(\rho)$ and an angular phase term $f5_4(\theta)$.

Therefore the five circular vortices $CV_{01}$(rt,+), $CV_{11}$(rt,+), $CV_{21}$(rt,+), $CV_{31}$(rt,+), $CV_{41}$(rt,+) are excited at the input facet of the optical fiber 40 and have different values of the propagation constants ($\beta_1$, $\beta_2$, $\beta_3$, $\beta_4$, $\beta_5$ respectively), having a right circular polarization and a clockwise screw direction: said five circular vortices propagate along the multi-mode optical fiber 40, by maintaining unchanged their respective values of the propagation constants $\beta_1$, $\beta_2$, $\beta_3$, $\beta_4$, $\beta_5$.

Moreover, as explained herein, the minimum difference between the values of the propagation constants $\beta_1$, $\beta_2$, $\beta_3$, $\beta_4$, $\beta_5$ of the five circular vortices $CV_{01}$(rt,+), $CV_{11}$(rt,+), $CV_{21}$(rt,+), $CV_{31}$(rt,+), $CV_{41}$(rt,+) is at least equal to or greater than $1.5*10^2$ m$^{-1}$, and this said minimum difference is maintained during the propagation along the multi-mode optical fiber 40. In one embodiment, the difference between the two is greater than $1.0*10^{-2}$ m$^{-1}$ and less than $5.0*10^{-2}$ m$^{-1}$. In another embodiment, the difference between propagation constants of a first signal and a second signal could be proportional to the difference between 3 and 11, or 4 and 12, as explained in Examples 2.1 and 2.2. Namely, the difference could be in the range of a number that is proportional to 8, such as 80 m$^{-1}$ or 800 m$^{-1}$.

It is assumed that the multi-mode optical fiber 40 is affected by external perturbations; therefore during the propagation (which occurs between instants $t_4$ and $t_5$) along the optical fiber 40, the circular vortices opposite to the ones excited at the input face are also excited, that is the circular vortices $CV_{01}$(lt,−), $CV_{11}$(lt,−), $CV_{21}$(lt,−), $CV_{31}$(lt,−), $CV_{41}$(lt,−) are excited. It is observed that the opposite circular vortices $CV_{01}$(lt,−), $CV_{11}$(lt,−), $CV_{21}$(lt,−), $CV_{31}$(lt,−), $CV_{41}$(lt,−) have the same values (which remain unchanged) of the propagation constant of the circular vortices $CV_{01}$(rt,+), $CV_{11}$(rt,+), $CV_{21}$(rt,+), $CV_{31}$(rt,+), $CV_{41}$(rt,+), that is $CV_{01}$(lt,−) has the propagation constant $\beta_1$, $CV_{11}$(lt,−) has the propagation constant $\beta_2$, $CV_{21}$(lt,−) has the propagation constant $\beta_3$, $CV_{31}$(lt,−) has the propagation constant $\beta_4$ and $CV_{41}$(lt,−) has the propagation constant $\beta_5$.

At instant $t_6$ (subsequent to instant $t_5$) the optical signal of the circular vortices $CV_{01}$(rt,+), $CV_{11}$(rt,+), $CV_{21}$(rt,+), $CV_{31}$(rt,+), $CV_{41}$(rt,+) and of the opposite circular vortices $CV_{01}$(lt,−), $CV_{11}$(lt,−), $CV_{21}$(lt,−), $CV_{31}$(lt,−), $CV_{41}$(lt,−) is received at the output face of the multi-mode optical fiber 40, wherein the received guided circular vortices CVFR1, CVFR2, CVFR3, CVFR4, CVFR5 are a linear combination of opposite circular vortices, that is:

the first received guided circular vortex CVFR1 is a linear combination of $CV_{01}$(rt,+) and of $CV_{01}$(lt,−);
the second received guided circular vortex CVFR2 is a linear combination of $CV_{11}$(rt,+) and of $CV_{11}$(lt,−);
the third received guided circular vortex CVFR3 is a linear combination of $CV_{21}$(rt,+) and of $CV_{21}$(lt,−);
the fourth received guided circular vortex CVFR4 is a linear combination of $CV_{31}$(rt,+) and of $CV_{31}$(lt,−);
the fifth received guided circular vortex CVFR5 is a linear combination of $CV_{41}$(rt,+) and of $CV_{41}$(lt,−).

The output face of the multi-mode optical fiber 40 transmits the optical signal CVSL carrying the received guided circular vortices CVFR1, CVFR2, CVFR3, CVFR4 and CVFR5.

At instant $t_7$ (subsequent to instant $t_6$) the diffraction grating 110 receives the transmitted optical signal CVSL and generates therefrom the five diffracted free space optical vortices VSLD1, VSLD2, VSLD3, VSLD4, VSLD5, which are diffracted in different angular directions. In particular, the first diffracted free space optical vortex VSLD1 carries an optical signal correlated to the circular vortices $CV_{01}$(rt,+) and $CV_{01}$(lt,−), the second diffracted free space optical vortex VSLD2 carries an optical signal correlated to the circular vortices $CV_{11}$(rt,+) and $CV_{11}$(lt,−), the third diffracted free space optical vortex VSLD3 carries an optical signal correlated to the circular vortices $CV_{21}$(rt,+) and $CV_{21}$(lt,−), the fourth diffracted free space optical vortex VSLD4 carries an optical signal correlated to the circular vortices $CV_{31}$(rt,+) and $CV_{31}$(lt,−) and the fifth diffracted free space optical vortex VSLD5 carries an optical signal correlated to the circular vortices $CV_{41}$(rt,+) and $CV_{41}$(lt,−).

At instant $t_8$ (subsequent to instant $t_7$) the refractive optical element 111 receives the diffracted free space optical vortices VSLD1, VSLD2, VSLD3, VSLD4, VSLD5 and generates therefrom the five angularly amplified free space optical vortices VSLA1, VSLA2, VSLA3, VSLA4, VSLA5 respectively over five different angular directions, which have been increased with respect to the ones of the diffracted free space optical vortices VSLD1, VSLD2, VSLD3, VSLD4, VSLD5, in order to facilitate the detection of the optical signal from the photo-detectors.

Therefore the set of the diffraction grating 110 and of the refractive optical element 111 have performed the demultiplex of the following pairs of modes:

$CV_{01}$(rt,+), $CV_{01}$(lt,−);
$CV_{11}$(rt,+), $CV_{11}$(lt,−);
$CV_{21}$(rt,+), $CV_{21}$(lt,−);
$CV_{31}$(rt,+), $CV_{31}$(lt,−);
$CV_{41}$(rt,+), $CV_{41}$(lt,−).

At instant $t_9$ (subsequent to instant $t_8$) the first photo-detector 120 receives the optical signal of the first angularly amplified free space vortex VSLA1 and converts it into the current signal $I_1$: in this way, at the reception side, it has been recovered the information sent at the transmission side over the first circular vortex $CV_{01}$(rt,+).

Moreover, the second photo-detector 121 receives the optical signal of the second angularly amplified free space vortex VSLA2 and converts it into the current signal $I_2$: in this way at the reception side it has been recovered the information sent at the transmission side over the second circular vortex $CV_{11}$(rt,+).

Moreover, the third photo-detector 122 receives the optical signal of the third angularly amplified free space vortex VSLA3 and converts it into the current signal $I_3$: in this way at the reception side it has been recovered the information sent at the transmission side over the third circular vortex $CV_{21}(rt,+)$.

Moreover, the fourth photo-detector 123 receives the optical signal of the fourth angularly amplified free space vortex VSLA4 and converts it into the current signal $I_4$: in this way at the reception side it has been recovered the information sent at the transmission side over the fourth circular vortex $CV_{31}(rt,+)$.

Moreover, the fifth photo-detector 124 receives the optical signal of the fifth angularly amplified free space vortex VSLA5 and converts it into the current signal $I_5$: in this way at the reception side it has been recovered the information sent at the transmission side over the fifth circular vortex $CV_{41}(rt,+)$.

The operation of the optical communication system 1 according to the first variant of the embodiment of the invention is analogous to the one described for the embodiment, with the following differences.

At instant $t_9$, the first optical beam splitter 205 of the coherent optical detection module 220 receives the optical signal carrying the first angularly amplified free space vortex VSLA1 and replicates it over the first replicated optical vortex VOR1 and over the second replicated optical vortex VOR2.

The laser-type local oscillator 203 generates the local laser beam FL. The second optical beam splitter 204 receives the laser beam FL and replicates it over the first replicated laser beam FLR1 and over the second replicated laser beam FLR2.

At instant $t_{10}$ (subsequent to instant $t_9$) the first mirror 208 receives the first replicated optical vortex VOR1 and reflects it towards the optical reception module 260, forming the first reflected optical vortex VORF1.

Moreover, the second mirror 209 receives the first replicated laser beam FLR1 and reflects it towards the optical reception module 260, forming the first reflected laser beam FLRF1.

At instant $t_{11}$ (subsequent to instant $t_{10}$) the first holographic mask 207 receives the first reflected laser beam FLRF1 and converts it into the first free space local optical vortex VSLL1 having the transverse component of the electric (and magnetic) field equal to the one of the circular vortex $CV_{01}(rt,+)$, that is with radial term $fl_1(\rho)$, angular phase term $fl_0(\theta)$ and clockwise screw trend.

Moreover, the second holographic mask 206 receives the second replicated laser beam FLRF2 and converts it into the second free space local optical vortex VSLL2 having the transverse component of the electric (and magnetic) field equal to the one of the circular vortex $CV_{01}(lt,-)$, that is with radial term $fl_1(\rho)$, angular phase term $fl_0(\theta)$ and counter-clockwise screw trend.

At instant $t_{12}$ (subsequent to instant $t_{11}$) the optical reception module 260 receives the first reflected optical vortex VORF1, receives the first free space local optical vortex VSLL1 and performs the mixing of the optical signal of the first reflected optical vortex VORF1 with the optical signal of the first free space local optical vortex VSLL1 as described in the above mentioned papers. Moreover, the optical reception module 260 receives the second replicated optical vortex VOR2, receives the second free space local optical vortex VSLL2 and performs the mixing of the optical signal of the second replicated optical vortex VOR2 with the optical signal of the second free space local optical vortex VSLL2 as described in the above mentioned papers.

At instant $t_{13}$ (subsequent to instant $t_{12}$) the optical reception module 260 generates the current signal $I_{101}$, as a function of the performed operations of mixing.

It is also an object of the present invention a method for transmitting an optical signal over a substantially circular multi-mode optical fiber. The method comprises the step of transmitting, from an input facet of the multi-mode optical fiber, at least two guided circular vortices having respective propagation constants, wherein the values of the propagation constants at a defined frequency are different each other.

Preferably, the transmission method comprises the step of selecting the different values of the propagation constants having a minimum difference equal to about $0.5*10^2$ m$^{-1}$.

Preferably, the transmission method comprises the step of identifying the at least two guided circular vortices by an angular index l indicating the pitch of the screw of the front wave surface of the transverse spatial component of the electro-magnetic field of the at least two guided circular vortices and by a radial index m indicating the radial trend of the transverse spatial component of the electro-magnetic field of the at least two circular vortices. Further, the transmission method comprises the step of calculating the different values of the propagation constants by selecting different values of the following formula $2*m+l+1$, wherein:

m is an integer value greater than or equal to one;

l is an integer value greater than or equal to zero.

Further, the transmission method comprises the step of selecting, for each fixed value of the formula, a circular vortex among the possible circular vortices, and comprises the step of transmitting the at least two guided circular vortices equal to the selected circular vortices.

Advantageously, the transmission method comprises the step of setting the value of the radial index m equal to 1.

It is also an object of the present invention a method for receiving an optical signal from a substantially circular multi-mode optical fiber. The method comprises the step of receiving, at an output facet of the optical fiber, an optical signal carrying at least two guided circular vortices having respective propagation constants, wherein the values of at least two of said propagation constants at a defined frequency are different each other. Moreover, the reception method comprises the step of generating, from the at least two guided circular vortices, at least two free space optical vortices having different angular directions. Moreover, the reception method comprises the step of detecting the at least two free space optical vortices and generating therefrom at least two corresponding electric signals.

Preferably, the reception method comprises the step of receiving the at least two guided circular vortices wherein the minimum difference between the values of at least two of the different propagation constants is equal to about $0.5*10^2$ m$^{-1}$.

Preferably, the reception method comprises the step of identifying the at least two guided circular vortex with an angular index l indicating the screw pitch of the surface of the wavefront of the transverse spatial component of the electro-magnetic field of the at least two guided circular vortices and with a radial index m indicating the radial trend of the transverse spatial component of the electro-magnetic field of the at least two circular vortices. Moreover, the reception method comprises the step of receiving the at least two guided circular vortices having at least two different values of the propagation constants by means of different values of the following formula $2*m+l+1$, wherein:
m is an integer value greater than or equal to one;
l is an integer value greater than or equal to zero.

Advantageously, the reception method comprises the step of receiving the at least two guided circular vortices having the value of the radial index m equal to one.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An optical communication system comprising an optical transmitter and a multi-mode substantially circular optical fiber, wherein the optical transmitter comprises:
   a generator of at least two circular vortices;
   an optical element configured to receive the at least two circular vortices and to couple them to an input of the optical fiber;
   wherein the optical fiber is configured to receive at the input the at least two circular vortices and generate therefrom at least two corresponding guided circular vortices having respective propagation constants, wherein the values of the propagation constants at a defined frequency are different from each other and wherein the difference between the different values of the propagation constants is equal to or greater than $0.5*10^2$ $m^{-1}$.

2. The optical communication system of claim 1 wherein the at least two guided circular vortices are identified by an angular index l indicating the step of the screw of the surface of the wavefront of the spatial transversal component of the electro-magnetic field of the at least two guided circular vortices and by a radial index m indicating the radial trend of the spatial transversal component of the electro-magnetic field of the at least two guided circular vortices,
   and wherein the different values of the propagation constants are calculated by selecting different values of the following formula: $2*m+l+1$,
   wherein:
   m is an integer value greater than or equal to one, in particular equal to one;
   l is an integer value greater than or equal to zero;
   and wherein the at least two guided circular vortices are generated by selecting, for each defined value of the formula, one circular vortex out of the possible circular vortices.

3. The optical communication system of claim 1, wherein the generator includes:
   at least two laser sources configured to generate at least two corresponding optical beams;
   a holographic mask configured to receive the at least two optical beams and generate therefrom at least two corresponding optical vortices;
   an optical polarizer configured to receive the at least two optical vortices and generate therefrom the at least two circular vortices respectively.

4. The optical transmitter of claim 1 wherein the circular vortices are free space circular vortices.

5. The optical transmitter of claim 1 wherein the input to the optical fiber is an input facet of the optical fiber.

6. The optical transmitter of claim 1 wherein the two propagation constants are different from each other by greater than $1.5*10^2$ $m^{-1}$.

7. The optical transmitter of claim 6 wherein the two propagation constants are different from each other by greater than $1.0*10^2$ $m^{-1}$ and less than $5.0*10^2$ $m^{-1}$.

8. An optical communication system comprising a multi-mode substantially circular optical fiber and an optical receiver,
   wherein the optical fiber is configured to output at an output of the optical fiber an optical signal carrying at least two guided circular vortices having respective propagation constants, wherein the values of at least two of said propagation constants at a defined frequency are different each other and wherein the difference between the different values of the propagation constants is equal to or greater than about $0.5*10^2$ $m^{-1}$,
   and wherein the optical receiver includes:
   an optical element configured to receive the optical signal carrying the at least two guided circular vortices and generate therefrom at least two optical vortices having different angular directions;
   at least two detecting modules configured to receive the at least two optical vortices and generate therefrom at least two corresponding electrical signals.

9. The optical communication system of claim 8 wherein the at least two guided circular vortices are identified by an angular index l indicating the step of the screw of the surface of the wavefront of the spatial transversal component of the electro-magnetic field of the at least two guided circular vortices and by a radial index m indicating the radial trend of the spatial transversal component of the electro-magnetic field of the at least two guided circular vortices,
   and wherein the different values of the propagation constants are calculated by selecting different values of the following formula: $2*m+l+1$,
   wherein:
   m is an integer value greater than or equal to one, in particular equal to one;
   l is an integer value greater than or equal to zero;
   and wherein the at least two guided circular vortices are generated by selecting, for each defined value of the formula, one circular vortex out of the possible circular vortices,
   and wherein the optical receiver includes:
   an optical element configured to receive the optical signal carrying the at least two guided circular vortices and generate therefrom at least two optical vortices having different angular directions;
   at least two detecting modules configured to receive the at least two optical vortices and generate therefrom at least two corresponding electrical signals.

10. The optical communication system of claim 8, wherein the optical element includes:
    a diffraction grating configured to receive the optical signal carrying the at least two guided circular vortices and generate therefrom at least two respective optical vortices having different angular directions;

a refracting optical element configured to receive the at least two optical vortices and generate therefrom at least two respective angularly amplified optical vortices.

11. The optical communication system of claim 10, wherein the at least two detecting modules are:
at least two respective photo-detectors, in particular photo-diodes; or
at least two respective coherent optical detecting modules, each one including:
a first optical beam divider configured to receive an angularly amplified optical vortex out of the at least two angularly amplified free space optical vortices and replicate it over a first replicated optical vortex and over a second replicated optical vortex);
a local laser source configured to generate a local laser beam;
a second optical beam divider configured to receive the local laser beam and replicate it over a first replicated laser beam and a second replicated laser beam;
a first holographic mask configured to receive the first replicated laser beam and convert it into a first free space local optical vortex;
a second holographic mask configured to receive the second replicated laser beam and convert it into a second free space local optical vortex;
an optical receiving module configured to mix the first replicated optical vortex with the first free space local optical vortex, configured to mix the second replicated optical vortex with the second free space local optical vortex and configured to generate, from the mixed signals, an electrical signal.

12. A method, comprising:
generating a first optical beam from a first laser;
generating a second optical beam from a second laser;
modifying the first optical beam in a first holographic mask to obtain a first circular vortex having a first propagation constant;
modifying the second optical beam in a second holographic mask to obtain a second circular vortex having a second propagation constant that is different from the first propagation constant by greater than $0.5*10^2$ $m^{-1}$;
transmitting, from an input face of a multi-mode optical fiber, the first and second circular vortices having respective propagation constants, wherein the values of the propagation constants at a defined frequency are different from each other by greater than about $0.5*10^2$ $m^{-1}$.

13. The method of claim 12, further including:
receiving, at an output face of the optical fiber, the transmitted optical signal carrying the first and second circular vortices having respective propagation constants, wherein the values of at least two of said propagation constants at a defined frequency are different each other by greater than about $0.5*10^2$ $m^{-1}$;
generating, from the first and second circular vortices, at least two free space optical vortices having different angular directions; and detecting the first and second optical vortices and generating therefrom at least two corresponding electrical signals.

14. The method according to claim 13 wherein the first and second circular vortices are identified by an angular index l indicating the step of the screw of the surface of the wavefront of the spatial transversal component of the electro-magnetic field of the first and second circular vortices and by a radial index m indicating the radial trend of the spatial transversal component of the electro-magnetic field of the first and second circular vortices,
and wherein the different values of the propagation constants are calculated by selecting different values of the following formula: $2*m+l+1$,
wherein:
m is an integer value greater than or equal to one, in particular equal to one;
l is an integer value greater than or equal to zero;
and wherein the first and second circular vortices are generated by selecting, for each defined value of the formula, one circular vortex out of the possible circular vortices.

15. The method for transmitting an optical signal over a multi-mode substantially circular optical fiber, according to claim 12 further including:
modifying the laser beams in the respective holographic masks by an angular index l indicating the step of the screw of the surface of the wavefront of the spatial transversal component of the electro-magnetic field of the first and second circular vortices and by a radial index m indicating the radial trend of the spatial transversal component of the electro-magnetic field of the first and second circular vortices,
and wherein the different values of the propagation constants are calculated by selecting different values of the following formula: $2*m+l+1$,
wherein:
m is an integer value greater than or equal to one, in particular equal to one;
l is an integer value greater than or equal to zero;
and wherein the first and second circular vortices are generated by selecting, for each defined value of the formula, one circular vortex out of the possible circular vortices.

16. The method according to claim 12 wherein the circular vortices that are transmitted in the optical fiber are guided circular vortices.

17. The method according to claim 12 wherein the second propagation constant is different from the first propagation constant by between 50 $m^{-1}$ and 150 $m^{-1}$.

18. The method according to claim 12 wherein the second propagation constant is different from the first propagation constant by between 100 $m^{-1}$ and 500 $m^{-1}$.

* * * * *

UNITED STATES PATENT AND TRADEMARK OFFICE
CERTIFICATE OF CORRECTION

PATENT NO.         : 9,571,196 B2                            Page 1 of 1
APPLICATION NO.    : 14/129903
DATED              : February 14, 2017
INVENTOR(S)        : Paolo Martelli et al.

It is certified that error appears in the above-identified patent and that said Letters Patent is hereby corrected as shown below:

In the Claims

Column 26, Line 23:
"quency are different each other and wherein the differ-" should read, --quency are different from each other and wherein the differ- --.

Column 27, Line 15:
"over a second replicated optical vortex);" should read, --over a second replicated optical vortex;--.

Signed and Sealed this
Seventh Day of November, 2017

Joseph Matal
*Performing the Functions and Duties of the
Under Secretary of Commerce for Intellectual Property and
Director of the United States Patent and Trademark Office*